(12) United States Patent
Fudemoto et al.

(10) Patent No.: US 12,163,028 B2
(45) Date of Patent: Dec. 10, 2024

(54) RESIN-RUBBER COMPOSITE, TIRE, AND METHOD OF PRODUCING RESIN-RUBBER COMPOSITE

(71) Applicants: BRIDGESTONE CORPORATION, Tokyo (JP); OSAKA UNIVERSITY, Suita (JP)

(72) Inventors: Hiroyuki Fudemoto, Tokyo (JP); Atsushi Fukushima, Tokyo (JP); Masahiro Homma, Tokyo (JP); Yuji Ohkubo, Suita (JP); Kazuya Yamamura, Suita (JP)

(73) Assignees: BRIDGESTONE CORPORATION, Tokyo (JP); OSAKA UNIVERSITY, Osaka (JP)

( * ) Notice: Subject to any disclaimer, the term of this patent is extended or adjusted under 35 U.S.C. 154(b) by 901 days.

(21) Appl. No.: 17/050,172

(22) PCT Filed: Apr. 26, 2019

(86) PCT No.: PCT/JP2019/018014
§ 371 (c)(1),
(2) Date: Oct. 23, 2020

(87) PCT Pub. No.: WO2019/208799
PCT Pub. Date: Oct. 31, 2019

(65) Prior Publication Data
US 2021/0102048 A1    Apr. 8, 2021

(30) Foreign Application Priority Data
Apr. 26, 2018 (JP) ................................. 2018-085709

(51) Int. Cl.
*C08L 9/06* (2006.01)
*B60C 1/00* (2006.01)
*B60C 15/04* (2006.01)

(52) U.S. Cl.
CPC .................. *C08L 9/06* (2013.01); *B60C 1/00* (2013.01); *B60C 15/04* (2013.01); *B60C 2001/005* (2013.01); *B60C 2001/0066* (2013.01)

(58) Field of Classification Search
CPC ............. C08L 9/06; B60C 1/00; B60C 15/04; B60C 2001/005; B60C 2001/0066
See application file for complete search history.

(56) References Cited

U.S. PATENT DOCUMENTS

| | | |
|---|---|---|
| 2013/0206301 A1 | 8/2013 | Fudemoto et al. |
| 2015/0202923 A1 | 7/2015 | Nakazono et al. |
| 2016/0176232 A1 | 6/2016 | Brace et al. |
| 2017/0282469 A1 | 10/2017 | Yamamura et al. |
| 2023/0167292 A1* | 6/2023 | Ohkubo ............... B32B 27/283 428/421 |

FOREIGN PATENT DOCUMENTS

| | | |
|---|---|---|
| EP | 0 172 057 A1 | 2/1986 |
| JP | 61-019343 A | 1/1986 |
| JP | 06-143914 A | 5/1994 |
| JP | 09-300924 A | 11/1997 |
| JP | 2011-224954 A | 11/2011 |
| JP | 2011-242279 A | 12/2011 |
| JP | 2012-035435 A | 2/2012 |
| JP | 2012-046030 A | 3/2012 |
| JP | 2014-047327 A | 3/2014 |
| JP | 2016-056363 A | 4/2016 |
| WO | 2008/044884 A1 | 4/2008 |

OTHER PUBLICATIONS

English Machine Translation of JP 2011-224954 (Year: 2011).*
International Search Report for PCT/JP2019/018014, dated Aug. 6, 2019.
Extended European Search Report dated Dec. 9, 2021 issued for European Patent Application No. 19792077.0.

\* cited by examiner

*Primary Examiner* — Angela C Scott
(74) *Attorney, Agent, or Firm* — Sughrue Mion, PLLC

(57) ABSTRACT

A resin-rubber composite includes: a resin member that has a treated surface, to which a surface treatment by means of a plasma treatment has been applied; and a rubber member that is disposed in contact with the treated surface of the resin member and includes a rubber, a filler having a silanol group, and a silane coupling agent, with a filler content of from 30 phr to 100 phr with respect to 100 phr of the rubber, and a silane coupling agent content of from 2 parts by mass to 15 parts by mass with respect to 100 parts by mass of the filler.

6 Claims, 3 Drawing Sheets

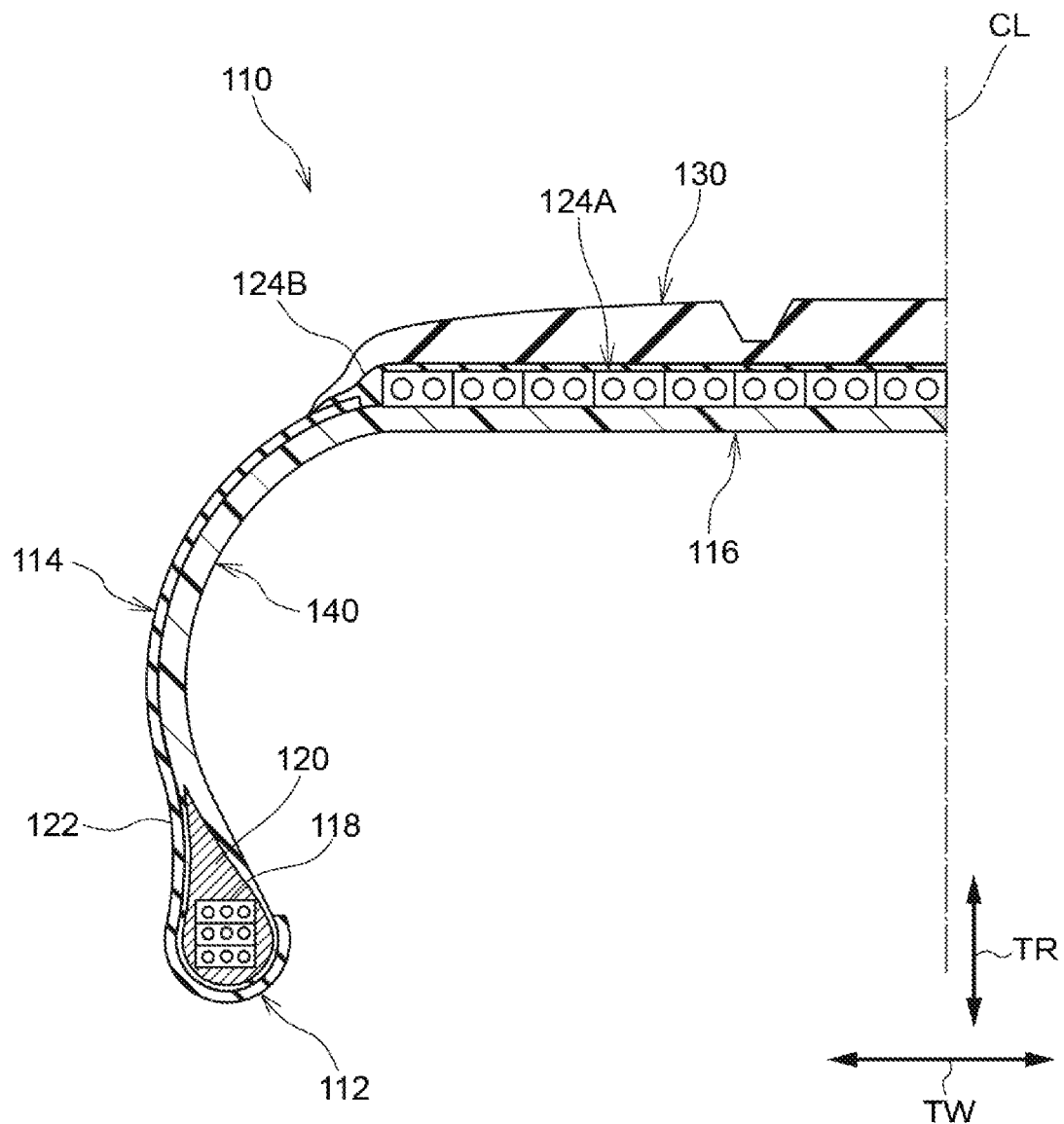

RESIN-RUBBER COMPOSITE, TIRE, AND METHOD OF PRODUCING RESIN-RUBBER COMPOSITE

CROSS REFERENCE TO RELATED APPLICATIONS

This application is a National Stage of International Application No. PCT/JP2019/018014, filed Apr. 26, 2019. Further, this application claims priority from Japanese Patent Application No. 2018-085709 filed Apr. 26, 2018.

TECHNICAL FIELD

The present disclosure relates to a resin-rubber composite, a tire, and a method of producing a resin-rubber composite.

BACKGROUND ART

Conventionally, a resin-rubber composite, in which a resin member and a rubber member are adhered to each other, has been used in various fields. For example, in the field of tires, the use of a resin member has been examined, from the viewpoints of achieving a reduction in weight, ease of forming, ease of recycling, and the like. Further, trials have been conducted in which this resin member is adhered to a rubber member such as a tire frame made of rubber, a tread, or a belt member, and used.

For example, Patent Document 1 discloses a tire including at least a circular tire frame formed from a thermoplastic resin material, the tire further including a reinforcing cord member, which is wound on an outer peripheral portion of the tire frame in the circumferential direction to form a reinforcing cord layer, in which the thermoplastic resin material includes at least a thermoplastic polyamide elastomer.

However, it is not easy to improve the adhesiveness between a resin member and a rubber member, since the respective materials thereof are different. Therefore, an adhesive (for example, an organic solvent-based adhesive) is provided between the two members, thereby enhancing the adhesiveness.

Further, experiments have been conducted on a method for improving the adhesiveness without using an adhesive. For example, Patent Document 2 discloses a method for producing a surface-modified molded body by adjusting the surface temperature of a molded body including an organic high molecular compound to a temperature that is lower by at least 120° C. than the melting temperature of the organic high molecular compound, and applying an atmospheric pressure plasma treatment to the surface of the molded body, thereby introducing a peroxide radical.
[Patent Document 1] Japanese Patent Application Laid-Open (JP-A) No. 2012-46030
[Patent Document 2] JP-A No. 2016-56363

SUMMARY OF INVENTION

Technical Problem

When, as described above, an organic solvent-based adhesive is used, it is necessary to vaporize the solvent after the formation of the coated film, and time is needed for the drying step. Further, in respect of the operational environment, equipment such as exhaust equipment is required, and thus, there is room for improvement from the viewpoints of ease of manufacturing, reduction in costs, and the like.

Therefore, in a resin-rubber composite in which a resin member and a rubber member are disposed in contact with each other, it is necessary to ensure excellent adhesiveness between the two members even in a state in which the two members are in direct contact with each other without using an adhesive therebetween.

Meanwhile, as shown in Patent Document 2, with regard, also, to a surface-modified molded body in which adhesiveness with respect to another member such as a rubber member is enhanced by applying an atmospheric pressure plasma treatment to the surface of a molded body, which is a resin material, there remains room for improvement of the adhesiveness, and yet more excellent adhesiveness is required.

The present disclosure has been made in view of the above circumstances, and aims to accomplish the following. Namely, an aspect of the disclosure is to provide a resin-rubber composite having excellent adhesiveness between a resin member and a rubber member that is in direct contact with the resin member, a tire including the resin-rubber composite, and a method of producing the resin-rubber composite.

Solution to Problem

The summary of the present disclosure is as follows.
<1> A resin-rubber composite provided with:
a resin member that has a treated surface, to which a surface treatment including a plasma treatment has been applied; and
a rubber member that is disposed in contact with the treated surface of the resin member and that includes a rubber, a filler having a silanol group, and a silane coupling agent, with a filler content of from 30 phr to 100 phr with respect to 100 phr of the rubber, and a silane coupling agent content of from 2 parts by mass to 15 parts by mass with respect to 100 parts by mass of the filler.

Advantageous Effects of Invention

According to the present disclosure, a resin-rubber composite having an excellent adhesiveness between a resin member and a rubber member that is in direct contact with the resin member, a tire including the resin-rubber composite, and a method for producing the resin-rubber composite may be provided.

BRIEF DESCRIPTION OF DRAWINGS

FIG. 2 is a cross-sectional view of a half of a tire, showing one side of a cut section when cutting a tire of another mode according to an embodiment of the present disclosure along the tire width direction.

DESCRIPTION OF EMBODIMENTS

Figure 1:
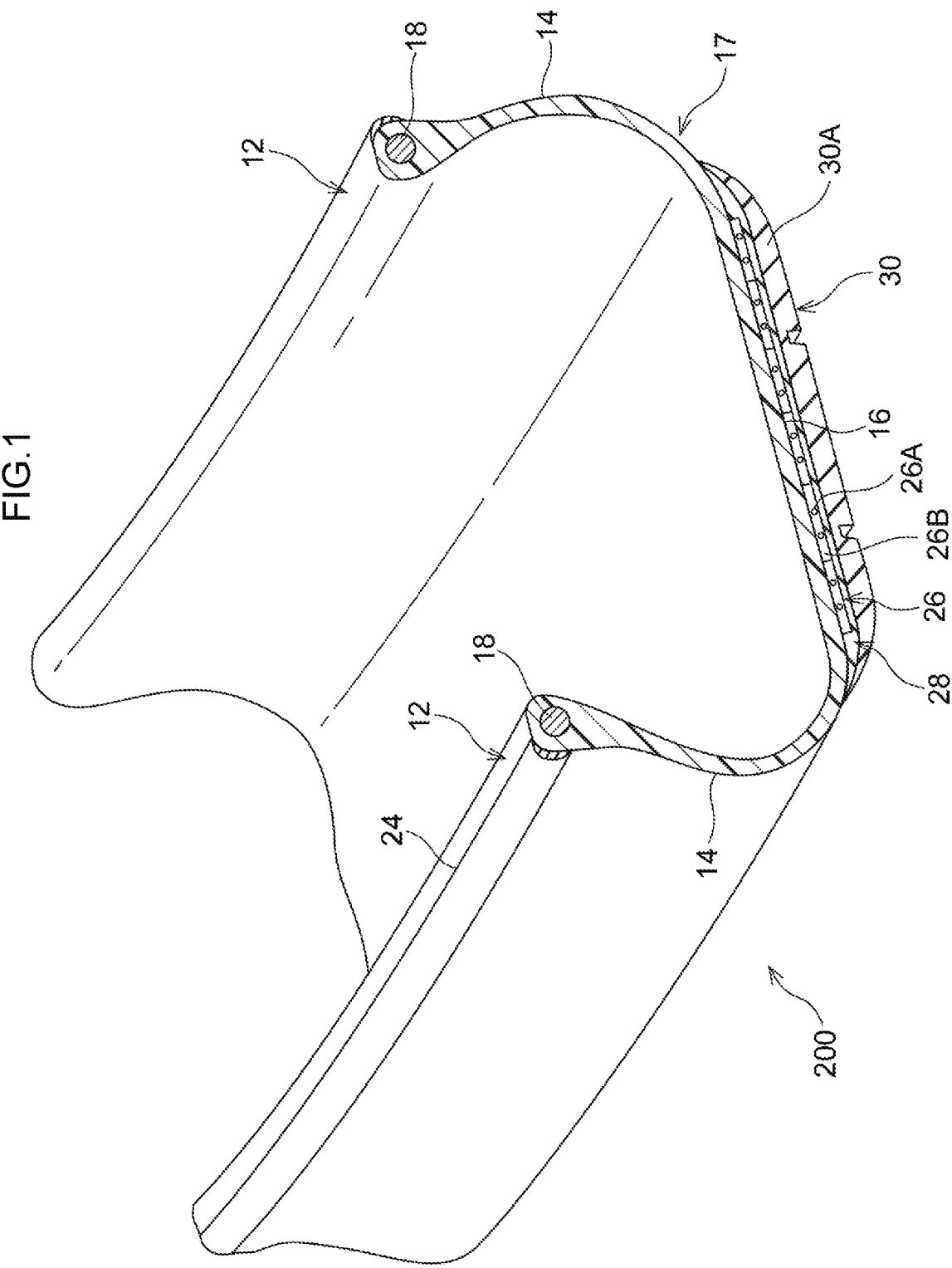
FIG. 1 is a cross-sectional view of a tire, showing a tire according to an embodiment of the present disclosure.

Specific embodiments of the disclosure will be described below in detail. However, the present disclosure is not restricted to the following embodiments by any means, and the disclosure can be carried out with modification as appropriate within the intended scope of the disclosure.

Note that, in the present specification, a numeral range expressed using "to" means a range including numerical values described in front of and behind "to" as the lower limit value and the upper limit value.

<Resin-Rubber Composite>

The resin-rubber composite according to the embodiment of the present disclosure has a resin member and a rubber member that is in contact with the resin member.

The resin member has a treated surface, to which surface treatment using plasma treatment has been applied.

The rubber member is in contact with the treated surface in the resin member, and includes rubber, a filler having a silanol group, and a silane coupling agent. The content of the filler is from 30 phr to 100 phr with respect to 100 phr of the rubber, and the content of the silane coupling agent is from 2 parts by mass to 15 parts by mass with respect to 100 parts by mass of the filler.

In recent years, the use of resin members has been investigated in the field of tires or the like, from the viewpoints of achieving a reduction in weight, ease of forming, ease of recycling, and the like. There may be a case in which such a resin member is placed at a position where the resin member comes into contact with a rubber member. In this case, since the materials of the resin member and the rubber member are different, an adhesive (for example, an organic solvent-based adhesive) is provided between the resin member and the rubber member to enhance the adhesiveness, intending to avoid interfacial separation or the like.

However, when an organic solvent-based adhesive is used, it is necessary to vaporize the solvent after the formation of the coated film, and time is needed for the drying step. Further, in respect of the operational environment, equipment such as exhaust equipment is required, and thus, there is room for improvement from the viewpoints of achieving ease of manufacturing, a reduction in costs, and the like.

Therefore, in a resin-rubber composite in which a resin member and a rubber member are disposed in contact with each other, it is necessary to ensure excellent adhesiveness between the two members even in a state in which the two members are in direct contact with each other without using an adhesive therebetween.

In regard to the above, the present inventors have found that, by applying surface treatment using plasma treatment to the resin member, as well as adding a filler having a silanol group and a silane coupling agent to the rubber member, with the contents described above, and by arranging this rubber member so as to be in contact with the treated surface in the resin member, the adhesiveness between the resin member and the rubber member becomes favorable.

The reason for this is guessed as follows.

First, interaction occurs between the surface of the resin member, the surface being activated through the surface treatment, and the silanol group possessed by the filler incorporated in the rubber member, so that the adhesiveness between the resin member and the filler is improved. Further, since the rubber member contains a silane coupling agent, the filler can be favorably dispersed, and the rubber in the rubber member and the filler having a silanol group are crosslinked, so that the adhesiveness between the filler and the rubber is also improved. It is guessed that, according to the above, the adhesiveness between the resin member and the rubber member is improved.

As described above, according to the resin-rubber composite having the above configuration according to the embodiment of the present disclosure, an excellent adhesiveness between the resin member and the rubber member is obtained, without using an adhesive.

Content of Filler

The content of the filler having a silanol group in the rubber member is from 30 phr to 100 phr, with respect to 100 phr of the rubber. The content is preferably from 35 phr to 100 phr, and more preferably from 40 phr to 90 phr.

When the content of the filler is 30 phr or higher, interaction between the resin in the resin member and the filler occurs sufficiently, and the adhesiveness between the resin member and the rubber member is improved. When the content of the filler is 100 phr or lower, it is possible to ensure the dispersion of the filler in the rubber, troubles in production such as sheet formation do not occur, and a significant decrease in rubber strength is suppressed, it is thus preferable.

Content of Silane Coupling Agent

The content of the silane coupling agent in the rubber member is from 2 parts by mass to 15 parts by mass, with respect to 100 parts by mass of the filler. The content is preferably from 3 parts by mass to 14 parts by mass, and more preferably from 3 parts by mass to 13 parts by mass.

When the content of the silane coupling agent is 2 parts by mass or higher, crosslink with the filler, which interacts with the resin in the resin member, is sufficiently formed, whereby the adhesiveness between the resin member and the rubber member is improved. When the content of the silane coupling agent is 15 parts by mass or lower, prevention of the interaction between the filler and the resin, due to covering of the filler by the silane coupling agent, is suppressed and, as a result, the adhesiveness between the resin member and the rubber member is improved.

Next, the configuration of the resin-rubber composite according to the embodiment of the present disclosure will be described in detail.

The resin-rubber composite according to the embodiment of the disclosure includes a resin member and a rubber member that is in contact with the resin member. Note that, a mode in which a second rubber member that is in contact with this rubber member is further included is also possible.

Here, the method for producing the resin-rubber composite according to the embodiment of the disclosure is not particularly limited. For example, the resin-rubber composite may be produced by a production method including: a surface treatment step of applying surface treatment using plasma treatment to at least a part of a surface in the resin member; and an adhesion step of arranging the rubber member, which includes rubber, a filler having a silanol group, and a silane coupling agent with a filler content and a silane coupling agent content each being in the above range, so as to be in contact with the surface, to which surface treatment has been applied, in the resin member, and then applying heat, thereby adhering the resin member and the rubber member to each other.

Note that, in this specification, the term "step" includes not only an independent step, but also a case which cannot be clearly distinguished from other step, as long as the purpose is achieved.

(Application)

The resin-rubber composite according to the embodiment of the disclosure is applied in various fields where a resin member and a rubber member are used. Examples include fields of tires, anti-vibration rubber, rubber hoses, rubber resin composite-type hoses, belts, rubber crawlers, golf balls, bellows, seismic base isolation rubber, sealing materials, caulking materials, bicycles, or the like.

In the case of using the resin-rubber composite in a tire, examples of a combination of the resin member and the rubber member include the following combinations.

- A combination of a belt layer as the resin member, and at least one member selected from a tread, a tire frame, or a rubber sheet adhered to the surface of the belt layer, as the rubber member.
- A combination of a bead member as the resin member, and at least one member selected from a tire frame, or a rubber sheet adhered to the surface of the bead member, as the rubber member.
- A combination of a tire frame as the resin member, and at least one member selected from a tread, a belt layer, a bead member, or a rubber sheet adhered to the surface of the tire frame, as the rubber member.
- A combination of a belt cord as the resin member, and at least one member selected from a cord coating layer that covers the belt cord, or a rubber sheet adhered to the surface of the belt cord, as the rubber member (that is, the belt layer is a resin-rubber composite).
- A combination of a bead wire as the resin member, and at least one member selected from a wire coating layer that covers the bead wire, or a rubber sheet adhered to the surface of the bead wire, as the rubber member (that is, the bead core is a resin-rubber composite).

Note that, the above "tire frame as the rubber member" may be replaced by a member that forms the skeleton of a tire, such as a carcass (for example, a carcass consisting of a carcass ply in which the periphery of a plurality of wires is covered with rubber), which corresponds to the rubber member.

Especially, as a mode in which the resin-rubber composite has a resin member, a rubber member that is in contact with the resin member, and a second rubber member that is in contact with this rubber member, examples of a combination include the following combinations.

- A combination of a belt layer as the resin member, a rubber sheet as the rubber member, and at least one member selected from a tread, a tire frame, or a side rubber, as the second rubber member.
- A combination of a bead member as the resin member, a rubber sheet as the rubber member, and at least one member selected from a tire frame or a side rubber, as the second rubber member.
- A combination of a tire frame as the resin member, a rubber sheet as the rubber member, and at least one member selected from a tread, a belt layer, a bead member, or a side rubber, as the second rubber member.
- A combination of a belt cord as the resin member, a rubber sheet as the rubber member, and a cord coating layer as the second rubber member (that is, the belt layer is a resin-rubber composite).
- A combination of a bead wire as the resin member, a rubber sheet as the rubber member, and a wire coating layer as the second rubber member (that is, the bead core is a resin-rubber composite).

Note that, the above "tire frame as the second rubber member" may be replaced by a member that forms the skeleton of a tire, such as a carcass (for example, a carcass consisting of a carcass ply in which the periphery of a plurality of wires is covered with rubber), which corresponds to the second rubber member.

The configuration of a tire including a resin member, a rubber member, and a second rubber member, when further provided, will be described below.

Here, each of the resin member, the rubber member, and the second rubber member, which constitute the resin-rubber composite according to the embodiment of the disclosure, will be described in detail.

(Resin Member)

The resin member has a treated surface, to which surface treatment using plasma treatment has been applied. By applying the above surface treatment, the treated surface in the resin member is activated, and accordingly, the adhesiveness with respect to the rubber member, which includes a filler having a silanol group and a silane coupling agent such that the contents are each in the above range, is improved.

Group to be Introduced

It is preferable that an active group, which interacts with the silanol group, is introduced into the treated surface in the resin member through the above surface treatment.

Examples of the active group to be introduced through the surface treatment using plasma treatment include an oxidation group, such as a peroxy radical (—O—O·), a hydroperoxide group (—O—OH), a carbonyl group (—C(=O)—), an aldehyde group (—C(=O)—H), a carboxyl group (—C(=O)—OH), or a hydroxyl group (—OH), and the like.

Among these, from the viewpoint of improvement in the adhesiveness, it is more preferable that at least one kind selected from the group consisting of a peroxy radical (—O—O·), a hydroperoxide group (—O—OH), a carbonyl group (—C(=O)—), an aldehyde group (—C(=O)—H), a carboxyl group (—C(=O)—OH), and a hydroxyl group (—OH) is introduced.

Contact Angle for Water

With regard to the treated surface, to which surface treatment has been applied, in the resin member, the contact angle of water on the treated surface is preferably from 20° to 98°, more preferably from 50° to 96°, and still more preferably from 60° to 95°, from the viewpoint of improvement in the adhesiveness.

The contact angle for water on the treated surface in the resin member is measured as follows. Namely, pure water is dropped on the treated surface, to which surface treatment has been applied, in the resin member, under 25° C., and the shape of the liquid droplet is observed using an automatic minimum contact angle meter (trade name: MCA-3) manufactured by Kyowa Interface Science Co., Ltd. In this way, the contact angle for water on the treated surface is measured.

Surface Treatment Method (Plasma Treatment Method)

Next, the method of the surface treatment to be applied to the surface of the resin member is explained.

There is no particular limitation as to the conditions when applying plasma treatment, as the surface treatment, to the surface of the resin member, as long as the surface that has been treated is activated, and a known method can be used. That is, conditions capable of generating plasma can be adopted as appropriate.

The temperature of the environment in the plasma treatment (that is, the environment under which the resin member is disposed and plasma is generated) is preferably from 0° C. to 240° C., more preferably from 10° C. to 220° C., and still more preferably from 15° C. to 200° C., from the viewpoint of improvement in the adhesiveness and the viewpoint of simplifying the plasma treatment.

Further, the atmospheric pressure of the environment in the plasma treatment is preferably from 5 hPa to 2,000 hPa, more preferably from 10 hPa to 1,500 hPa, and still more preferably from 10 hPa to 1,300 hPa, from viewpoint of improvement in the adhesiveness and the viewpoint of simplifying the plasma treatment.

For the generation of plasma, it is preferable to use, for example, a high frequency power source having an applied voltage frequency of from 50 Hz to 2.45 GHz.

Further, the output power per unit area (that is, the irradiation density) is, for example, 1 $W/cm^2$ or more, preferably 3 $W/cm^2$ or more, and more preferably 5 $W/cm^2$ or more. Whereas, the upper limit is not particularly limited, but is favorably, for example, 50 $W/cm^2$ or less.

Furthermore, in the case of using a pulse output, it is favorable to use a pulse modulation frequency of from 1 kHz to 50 kHz (preferably, from 5 kHz to 30 kHz) and a pulse duty of from 5% to 99% (preferably from 15% to 80%, and more preferably from 25% to 70%).

For the counter electrode, it is preferable to use a cylindrical or a flat plate-like metal whose one side is covered with a dielectric. The distance between the counter electrode and the resin member is not particularly limited, but is preferably 10 mm or less, more preferably 3 mm or less, still more preferably 1.2 mm or less, and particularly preferably 1 mm or less, The lower limit of the distance is not particularly limited, but is, for example, 0.5 mm or more.

The time for applying the plasma treatment (that is, the irradiating time) is preferably from 2 seconds to 30 minutes, more preferably from 30 seconds to 20 minutes, and still more preferably from 1 minute to 10 minutes, from the viewpoint of improvement in the adhesiveness and the viewpoint of simplifying the plasma treatment.

As the gas to be used for generating plasma, for example, a rare gas such as helium, argon, or neon, or a reactive gas such as oxygen, nitrogen, hydrogen, or ammonia can be used. That is, as the gas to be used in the embodiment of the disclosure, it is preferable to use only a non-polymerizable gas. Regarding these gases, one kind or two or more kinds of rare gases only may be used, or a mixed gas including one kind or two or more kinds of rare gases and an adequate amount of one kind or two or more kinds of reactive gases may be used.

The generation of plasma may be carried out under the conditions in which the gas atmosphere described above is controlled by using a chamber, or may be carried out, for example, under complete atmosphere releasing condition in which a rare gas is made to flow to the electrode portion.

Resin

The resin member in the embodiment of the disclosure includes a resin.

It is preferable that the resin member contains a resin as a main component. Specifically, the content of the resin with respect to the total amount of the resin member is preferably 50% by mass or higher, more preferably 60% by mass or higher, and still more preferably 75% by mass or higher.

Note that, in the present specification, the term "resin" is a concept which includes a thermoplastic resin, a thermoplastic elastomer, and a thermosetting resin, but does not include a vulcanized rubber.

The term "thermoplastic resin" means a high molecular compound which is a material that softens and flows as a temperature increases and turns into a relatively hard and strong state when being cooled, but which does not have a rubber-like elasticity.

The term "thermoplastic elastomer" means a copolymer having a hard segment and a soft segment. Note that, the term "hard segment" refers to a component which is relatively harder than the soft segment, and is preferably a molecule restricting component that plays a role of a cross-linking point of a crosslinked rubber, the crosslinking point preventing plastic deformation. On the other hand, the term "soft segment" refers to a component which is relatively softer than the hard segment, and is preferably a flexible component exhibiting a rubber elasticity.

Specifically, an example of the thermoplastic elastomer is a copolymer including a polymer constituting a hard segment which is crystalline and which has a high melting temperature or a hard segment which has a high cohesive force, and a polymer constituting a soft segment which is noncrystal and which has a low glass transition temperature. Further, an example of the thermoplastic elastomer is a high molecular compound which is a material that softens and flows as a temperature increases and turns into a relatively hard and strong state when being cooled, and which has a rubber-like elasticity. Note that, the hard segment may be, for example, a segment having a structure which contains a rigid group such as an aromatic group or an alicyclic group in the main skeleton, or a structure which enables intermolecular packing by intermolecular hydrogen bonding or $\pi$-$\pi$ interaction. Further, the soft segment may be, for example, a segment having a structure which contains a long chain group (for example, a long chain alkylene group or the like) in the main chain, in which molecules have a high degree of rotational freedom, and which has an elasticity.

Examples of the thermoplastic resin to be contained in the resin member may include a thermoplastic polyester resin, a thermoplastic polyamide resin, a thermoplastic polystyrene resin, a thermoplastic polyurethane resin, a thermoplastic polyolefin resin, a thermoplastic vinyl chloride resin, and the like.

Examples of the thermoplastic elastomer to be contained in the resin member include a thermoplastic polyester elastomer (TPEE), a thermoplastic polyamide elastomer (TPA), a thermoplastic polystyrene elastomer (TPS), a thermoplastic polyurethane elastomer (TPU), a thermoplastic polyolefin elastomer (TPO), other thermoplastic elastomer (TPZ), and the like, all of which are defined in JIS K6418.

Examples of the thermosetting resin to be contained in the resin member include a thermosetting phenolic resin, a thermosetting urea resin, a thermosetting melamine resin, a thermosetting epoxy resin, and the like.

In the resin member, these may be used singly or in a combination of two or more kinds thereof.

Above all, the resin to be contained in the resin member is preferably a thermoplastic polyester elastomer, a thermoplastic polyester resin, a thermoplastic polyamide elastomer, a thermoplastic polyamide resin, a thermoplastic polystyrene elastomer, a thermoplastic polystyrene resin, a thermoplastic polyurethane elastomer, a thermoplastic polyurethane resin, a thermoplastic polyolefin elastomer, or a thermoplastic polyolefin resin, and is more preferably a thermoplastic polyester elastomer or a thermoplastic polyester resin.

[Thermoplastic Elastomer]

—Thermoplastic Polyester Elastomer—

An example of the thermoplastic polyester elastomer is a material in which at least a polyester forms a hard segment, which is crystalline and which has a high melting temperature, and another polymer (for example, polyester, polyether, or the like) forms a soft segment which is noncrystal and which has a low glass transition temperature.

As the polyester that forms the hard segment, for example, an aromatic polyester can be used. The aromatic polyester can be formed from, for example, an aromatic dicarboxylic acid or an ester-forming derivative thereof, and an aliphatic diol. The aromatic polyester is preferably a polybutylene terephthalate being derived from 1,4-butanediol and at least one of terephthalic acid or dimethyl terephthalate. Further, the aromatic polyester may be, for example, a polyester being derived from a dicarboxylic acid component, such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, an ester-forming derivative of any of these dicarboxylic acids, and a diol component, that is a diol having a molecular weight of 300 or less (for example, an aliphatic diol, such as ethylene glycol, trimethylene glycol, pentamethylene glycol, hexamethylene glycol, neopentyl glycol, or decamethylene glycol; an alicyclic diol, such as 1,4-cyclohexane dimethanol or tricyclodecane dimethylol; an aromatic diol, such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl; or the like). Alternatively, the aromatic polyester may be a copolyester, which is obtained by using two or more kinds of the above-described dicarboxylic acid components and diol components in combination. It is also possible to copolymerize a polyfunctional carboxylic acid component, a polyfunctional oxyacid component, a polyfunctional hydroxy component, or the like, each of which has a functionality of three or more, in a range of 5% by mole or less.

Examples of the polyester that forms the hard segment include polyethylene terephthalate, polybutylene terephthalate, polymethylene terephthalate, polyethylene naphthalate, polybutylene naphthalate, and the like. Among them, polybutylene terephthalate is preferable.

Examples of the polymer that forms the soft segment include an aliphatic polyester, an aliphatic polyether, and the like.

Examples of the aliphatic polyether include poly(ethylene oxide)glycol, poly(propylene oxide)glycol, poly(tetramethylene oxide)glycol, poly(hexamethylene oxide) glycol, a copolymer of ethylene oxide and propylene oxide, an ethylene oxide addition polymer of poly(propylene oxide) glycol, a copolymer of ethylene oxide and tetrahydrofuran, and the like.

Examples of the aliphatic polyester include poly(ε-caprolactone), polyenantholactone, polycaprylolactone, poly(butylene adipate), poly(ethylene adipate), and the like.

Among these aliphatic polyethers and these aliphatic polyesters, as the polymer that forms the soft segment, poly(tetramethylene oxide) glycol, an ethylene oxide addition product of poly(propylene oxide) glycol, poly(ε-caprolactone), poly(butylene adipate), poly(ethylene adipate), and the like are preferable, from the viewpoint of the elasticity characteristic of an obtained polyester block copolymer.

The number average molecular weight of the polymer that forms the soft segment is preferably from 300 to 6,000, from the viewpoints of toughness and low temperature flexibility. Further, the mass ratio (x:y) of the hard segment (x) to the soft segment (y) is preferably from 99:1 to 20:80, and more preferably from 98:2 to 30:70, from the viewpoint of formability.

Examples of a combination of the hard segment and the soft segment may include the combinations of the respective hard segment and soft segment described above. Among them, as the combination of the hard segment and soft segment described above, a combination of poly(butylene terephthalate) as the hard segment and an aliphatic polyether as the soft segment is preferable, and a combination of poly(butylene terephthalate) as the hard segment and poly(ethylene oxide) glycol as the soft segment is more preferable.

As a commercially available product for the thermoplastic polyester elastomer, for example, "HYTREL" series (for example, 3046, 5557, 6347, 4047N, 4767N, and the like) manufactured by Du Pont-Toray Co., Ltd., "PELPRENE" series (for example, P30B, P40B, P40H, P55B, P70B, P150B, P280B, P450B, P150M, S1001, S2001, S5001, S6001, S9001, and the like) manufactured by Toyobo Co., Ltd., and the like may be used.

The thermoplastic polyester elastomer can be synthesized by copolymerizing the polymer that forms the hard segment and the polymer that forms the soft segment, according to a known method.

—Thermoplastic Polyamide Elastomer—

The term "thermoplastic polyamide elastomer" means a thermoplastic resin material being composed of a copolymer having a polymer that forms a hard segment, which is crystalline and which has a high melting temperature, and a polymer that forms a soft segment, which is noncrystal and which has a low glass transition temperature, wherein the polymer that forms the hard segment has an amide bond (—CONH—) in the main chain.

An example of the thermoplastic polyamide elastomer is a material, in which at least a polyamide forms a hard segment which is crystalline and which has a high melting temperature, and another polymer (for example, a polyester, a polyether, or the like) forms a soft segment which is noncrystal and which has a low glass transition temperature. Further, the thermoplastic polyamide elastomer may be formed using, in addition to the hard segment and the soft segment, a chain extending agent such as a dicarboxylic acid.

Specific examples of the thermoplastic polyamide elastomer may include thermoplastic polyamide-based elastomers (TPA) which are defined in JIS K6418: 2007, polyamide-based elastomers described in JP-A No. 2004-346273, and the like.

In the thermoplastic polyamide elastomer, examples of the polyamide that forms the hard segment may include a polyamide that is formed from a monomer represented by the following Formula (1) or Formula (2).

Formula (1)

[In Formula (1), $R^1$ represents a hydrocarbon molecular chain having from 2 to 20 carbon atoms (for example, an alkylene group having from 2 to 20 carbon atoms).]

Formula (2)

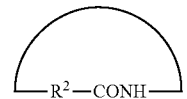

[In Formula (2), $R^2$ represents a hydrocarbon molecular chain having from 3 to 20 carbon atoms (for example, an alkylene group having from 3 to 20 carbon atoms).]

In Formula (1), le preferably represents a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms).

Further, in Formula (2), $R^2$ preferably represents a hydrocarbon molecular chain having from 3 to 18 carbon atoms (for example, an alkylene group having from 3 to 18 carbon atoms), more preferably a hydrocarbon molecular chain having from 4 to 15 carbon atoms (for example, an alkylene group having from 4 to 15 carbon atoms), and particularly preferably a hydrocarbon molecular chain having from 10 to 15 carbon atoms (for example, an alkylene group having from 10 to 15 carbon atoms).

Examples of the monomer represented by Formula (1) or Formula (2) include ω-aminocarboxylic acids and lactams. Further, examples of the polyamide that forms the hard segment include polycondensates of the above ω-aminocarboxylic acid or lactam, copolycondensates of a diamine and a dicarboxylic acid, and the like.

Examples of the ω-aminocarboxylic acid may include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, or 12-aminododecanoic acid, and the like. Examples of the lactam may include aliphatic lactams having from 5 to 20 carbon atoms, such as lauryl lactam, 8-caprolactam, undecanelactam, ω-enantholactam, or 2-pyrrolidone, and the like.

Examples of the diamine may include diamine compounds such as meta-xylene diamine and the like, and aliphatic diamines having from 2 to 20 carbon atoms and the like, for example, ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, and 3-methylpentamethylene diamine.

The dicarboxylic acid can be represented by HOOC—$(R^3)_m$—COOH ($R^3$: a hydrocarbon molecular chain having from 3 to 20 carbon atoms, m: 0 or 1). Examples thereof may include aliphatic dicarboxylic acids having from 2 to 20 carbon atoms, such as oxalic acid, succinic acid, glutaric acid, adipic acid, pimelic acid, suberic acid, azelaic acid, sebacic acid, or dodecanedioic acid.

As the polyamide that forms the hard segment, a polyamide obtained by ring-opening polycondensation of lauryl lactam, ε-caprolactam, or undecanelactam can be preferably used.

Examples of the polymer that forms the soft segment include a polyester, a polyether, and the like. Specific examples thereof include polyethylene glycol, polypropylene glycol, poly(tetramethylene ether) glycol, an ABA-type triblock polyether, and the like. These may be used singly or in a combination of two or more kinds thereof. Further, a polyetherdiamine obtained by reacting ammonia or the like with the end of a polyether, or the like may be also used.

Here, the "ABA-type triblock polyether" means a polyether represented by the following Formula (3).

Formula (3)

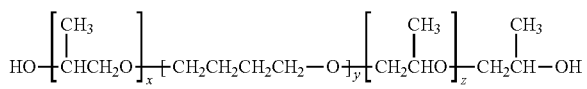

(3)

[In Formula (3), each of x and z represents an integer of from 1 to 20. y represents an integer of from 4 to 50.]

In Formula (3), each of x and z preferably represents an integer of from 1 to 18, more preferably an integer of from 1 to 16, still more preferably an integer of from 1 to 14, and particularly preferably an integer of from 1 to 12. Further, in Formula (3), y preferably represents an integer of from 5 to 45, more preferably an integer of from 6 to 40, still more preferably an integer of from 7 to 35, and particularly preferably an integer of from 8 to 30.

Examples of a combination of the hard segment and the soft segment may include the combinations of the respective hard segment and soft segment described above. Among them, as the combination of the hard segment and the soft segment, a combination of a ring-opening polycondensate of lauryl lactam and poly(ethylene glycol), a combination of a ring-opening polycondensate of lauryl lactam and poly(propylene glycol), a combination of a ring-opening polycondensate of lauryl lactam and poly(tetramethylene ether) glycol, and a combination of a ring-opening polycondensate of lauryl lactam and an ABA-type triblock polyether are preferable. Above all, a combination of a ring-opening polycondensate of lauryl lactam and an ABA-type triblock polyether is more preferable.

The number average molecular weight of the polymer (that is, polyamide) that forms the hard segment is preferably from 300 to 15,000, from the viewpoint of melt moldability. Meanwhile, the number average molecular weight of the polymer that forms the soft segment is preferably from 200 to 6,000, from the viewpoints of toughness and low temperature flexibility. Further, the mass ratio (x:y) of the hard segment (x) to the soft segment (y) is preferably from 50:50 to 90:10, and more preferably from 50:50 to 80:20, from the viewpoint of formability.

The thermoplastic polyamide elastomer can be synthesized by copolymerizing the polymer that forms the hard segment and the polymer that forms the soft segment, according to a known method.

As a commercially available product for the thermoplastic polyamide elastomer, for example, "UBESTA XPA" series (for example, XPA9068X1, XPA9063X1, XPA9055X1, XPA9048X2, XPA9048X1, XPA9040X1, XPA9040X2XPA9044, and the like) manufactured by UBE Industries, Ltd., "VESTAMID" series (for example, E40-S3, E47-S1, E47-S3, E55-S1, E55-S3, EX9200, E50-R2, and the like), manufactured by Daicel-Evonik Ltd., and the like may be used.

—Thermoplastic Polystyrene Elastomer—

An example of the thermoplastic polystyrene elastomer is a material, in which at least polystyrene forms a hard segment, and another polymer (for example, polybutadiene, polyisoprene, polyethylene, hydrogenate polybutadiene, hydrogenate polyisoprene, or the like) forms a soft segment which is noncrystal and which has a low glass transition temperature. As the polystyrene that forms the hard segment, those obtained by, for example, a known radical polymerization method, ionic polymerization method, or the like are favorably used. A specific example thereof is a polystyrene obtainable by an anionic living polymerization. Further, examples of a polymer that forms the soft segment include polybutadiene, polyisoprene, poly(2,3-dimethyl-butadiene), and the like.

Examples of a combination of the hard segment and the soft segment may include the combinations of the respective hard segment and soft segment described above. Among them, as the combination of the hard segment and the soft segment, a combination of polystyrene and polybutadiene, and a combination of polystyrene and polyisoprene are preferable. Further, the soft segment is preferably hydrogenated, in order to suppress unintended crosslinking of a thermoplastic elastomer.

The number average molecular weight of the polymer (that is, polystyrene) that forms the hard segment is preferably from 5,000 to 500,000, and more preferably from 10,000 to 200,000.

Meanwhile, the number average molecular weight of the polymer that forms the soft segment is preferably from 5,000 to 1,000,000, more preferably from 10,000 to 800,000, and still more preferably from 30,000 to 500,000. Further, the volume ratio (x:y) of the hard segment (x) to the soft segment (y) is preferably from 5:95 to 80:20, and more preferably from 10:90 to 70:30, from the viewpoint of formability.

The thermoplastic polystyrene elastomer can be synthesized by copolymerizing the polymer that forms the hard segment and the polymer that forms the soft segment, according to a known method.

Examples of the thermoplastic polystyrene elastomer include a styrene-butadiene based copolymer [for example, SBS (polystyrene-poly(butylene) block-polystyrene), SEBS (polystyrene-poly(ethylene/butylene) block-polystyrene)], a styrene-isoprene based copolymer (polystyrene-polyisoprene block-polystyrene), a styrene-propylene based copolymer [for example, SEP (polystyrene-poly(ethylene/propylene) block), SEPS (polystyrene-poly(ethylene/propylene) block-polystyrene), SEEPS (polystyrene-poly(ethylene-ethylene/propylene) block-polystyrene), or SEB (polystyrene-poly(ethylene/butylene) block)] and the like.

As a commercially available product for the thermoplastic polystyrene elastomer, for example, "TUFTEC" series (for example, H1031, H1041, H1043, H1051, H1052, H1053, H1062, H1082, H1141, H1221, H1272, and the like) manufactured by Asahi Kasei Corporation, and "SEBS" series (8007, 8076, and the like) and "SEPS" series (2002, 2063, and the like) all manufactured by Kuraray Co., Ltd. and the like can be used.

—Thermoplastic Polyurethane Elastomer—

An example of a thermoplastic polyurethane elastomer is a material, in which at least polyurethane forms a hard segment, with pseudo-crosslinks being formed by physical aggregation, and another polymer forms a soft segment, which is noncrystal and which has a low glass transition temperature.

Specific examples of the thermoplastic polyurethane elastomer include thermoplastic polyurethane elastomers (TPU) as defined according to JIS K6418: 2007. A thermoplastic polyurethane elastomer can be expressed as a copolymer including a soft segment that contains a unit structure represented by the following Formula A, and a hard segment that contains a unit structure represented by the following Formula B.

Formula A

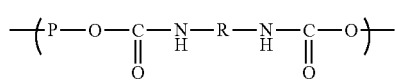

Formula B

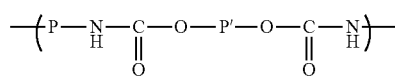

[In the formulae, P represents a long chain aliphatic polyether or a long chain aliphatic polyester. R represents an aliphatic hydrocarbon, an alicyclic hydrocarbon, or an aromatic hydrocarbon. P' represents a short chain aliphatic hydrocarbon, an alicyclic hydrocarbon, or an aromatic hydrocarbon.]

In Formula A, as the long chain aliphatic polyether or long chain aliphatic polyester represented by P, for example, those having a molecular weight of from 500 to 5,000 may be used. P is derived from a diol compound containing a long chain aliphatic polyether or long chain aliphatic polyester represented by P. Examples of such a diol compound include polyethylene glycol, polypropylene glycol, poly(tetramethylene ether) glycol, poly(butylene adipate) diol, poly-ε-caprolactone diol, poly(hexamethylene carbonate) diol, an ABA-type triblock polyether, and the like, each of which has a molecular weight being within the above range.

These may be used singly or in a combination of two or more kinds thereof.

In Formula A and Formula B, R is a partial structure introduced by using a diisocyanate compound containing the aliphatic hydrocarbon, alicyclic hydrocarbon, or aromatic hydrocarbon represented by R. Examples of the aliphatic diisocyanate compound containing the aliphatic hydrocarbon represented by R include 1,2-ethylene diisocyanate, 1,3-propylene diisocyanate, 1,4-butane diisocyanate, 1,6-hexamethylene diisocyanate, and the like.

Examples of the diisocyanate compound containing the alicyclic hydrocarbon represented by R include 1,4-cyclohexane diisocyanate, 4,4-cyclohexane diisocyanate, and the like. Further, examples of the aromatic diisocyanate compound containing the aromatic hydrocarbon represented by R include 4,4'-diphenylmethane diisocyanate, tolylene diisocyanate, and the like.

These may be used singly or in a combination of two or more kinds thereof.

As the short chain aliphatic hydrocarbon, the alicyclic hydrocarbon, or the aromatic hydrocarbon represented by P' in Formula B, for example, those having a molecular weight of smaller than 500 may be used. P' is derived from a diol compound containing a short chain aliphatic hydrocarbon, alicyclic hydrocarbon, or aromatic hydrocarbon represented by P'. Examples of the aliphatic diol compound containing a short chain aliphatic hydrocarbon represented by P' include glycol and a polyalkylene glycol. Specific examples thereof include ethylene glycol, propylene glycol, trimethylene glycol, 1,4-butanediol, 1,3-butanediol, 1,5-pentane diol, 1,6-hexane diol, 1,7-heptane diol, 1,8-octane diol, 1,9-nonane diol, 1,10-decane diol, and the like.

Further, examples of the alicyclic diol compound containing an alicyclic hydrocarbon represented by P' include cyclopentane-1,2-diol, cyclohexane-1,2-diol, cyclohexane-1,3-diol, cyclohexane-1,4-diol, cyclohexane-1,4-dimethanol, and the like.

Furthermore, examples of the aromatic diol compound containing an aromatic hydrocarbon represented by P' include hydroquinone, resorcin, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenyl sulfone, 4,4'-dihydroxybenzophenone, 4,4'-dihydroxydiphenyl methane, bisphenol A, 1,1-di(4-hydroxyphenyl)cyclohexane, 1,2-bis(4-hydroxyphenoxy)ethane, 1,4-dihydroxynaphthalene, 2,6-dihydroxynaphthalene, and the like.

These may be used singly or in a combination of two or more kinds thereof.

The number average molecular weight of the polymer (that is, polyurethane) that forms the hard segment is preferably from 300 to 1,500, from the viewpoint of melt moldability. Meanwhile, the number average molecular weight of the polymer that forms the soft segment is preferably from 500 to 20,000, more preferably from 500 to 5,000, and particularly preferably from 500 to 3,000, from the viewpoints of flexibility and thermal stability of the thermoplastic polyurethane elastomer. Further, the mass ratio (x:y) of the hard segment (x) and the soft segment (y) is preferably from 15:85 to 90:10, and more preferably from 30:70 to 90:10, from the viewpoint of formability.

The thermoplastic polyurethane elastomer can be synthesized by copolymerizing the polymer that forms the hard segment and the polymer that forms the soft segment, according to a known method. As the thermoplastic polyurethane elastomer, for example, a thermoplastic polyurethane described in JP-A No. H5-331256 may be used.

As the thermoplastic polyurethane elastomer, specifically, a combination of a hard segment being composed of an aromatic diol and an aromatic diisocyanate and a soft segment being composed of a polycarbonate ester is preferable. More specifically, at least one selected from the group consisting of a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenyl methane diisocyanate (MDI)/polyester-based polyol copolymer, a MDT/polyether-based polyol copolymer, a MDT/caprolactone-based polyol copolymer, a MDT/polycarbonate-based polyol copolymer, and a MDI+hydroquinone/poly(hexamethylene carbonate) copolymer is preferable. Above all, at least one selected from the group consisting of a TDI/polyester-based polyol copolymer, a TDI/polyether-based polyol copolymer, a MDT/polyester polyol copolymer, a MDI/polyether-based polyol copolymer, and a MDI+hydroquinone/poly(hexamethylene carbonate) copolymer is more preferable.

As a commercially available product for the thermoplastic polyurethane elastomer, for example, "ELASTOLLAN" series (for example, ET680, ET880, ET690, ET890, and the like) manufactured by BASF SE, "KURAMILON U" series (for example, 2000s, 3000s, 8000s, 9000s, and the like) manufactured by Kuraray Co., Ltd., "MIRACTRAN" series (for example, XN-2001, XN-2004, P390RSUP, P480RSUI, P26MRNAT, E490, E590, P890, and the like) manufactured by Nippon Miractran Co., Ltd., and the like may be used.

—Thermoplastic Polyolefin Elastomer—

An example of the thermoplastic polyolefin elastomer is a material, in which at least a polyolefin forms a hard segment which is crystalline and which has a high melting temperature, and another polymer (for example, another polyolefin, a polyvinyl compound, or the like) forms a soft segment which is noncrystal and has a low glass transition temperature. Examples of the polyolefin that forms the hard segment include polyethylene, polypropylene, isotactic polypropylene, polybutene, and the like.

Examples of the thermoplastic polyolefin elastomer include an olefin-α-olefin random copolymer, an olefin block copolymer, and the like. Specific examples thereof include a propylene block copolymer, an ethylene-propylene copolymer, a propylene-1-hexene copolymer, a propylene-4-methyl-1-pentene copolymer, a propylene-1-butene copolymer, an ethylene-1-hexene copolymer, an ethylene-4-methyl-pentene copolymer, an ethylene-1-butene copolymer, a 1-butene-1-hexene copolymer, 1-butene-4-methyl-pentene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, a propylene-vinyl acetate copolymer, and the like.

Among these, as the thermoplastic polyolefin elastomer, at least one selected from the group consisting of a propylene block copolymer, an ethylene-propylene copolymer, a propylene-1-hexene copolymer, a propylene-4-methyl-1pentene copolymer, a propylene-1-butene copolymer, an ethylene-1-hexene copolymer, an ethylene-4-methyl-pentene copolymer, an ethylene-1-butene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, and a propylene-vinyl acetate copolymer is preferable. At least one selected from the group consisting of an ethylene-propylene copolymer, a propylene-1-butene copolymer, an ethylene-1-butene copolymer, an ethylene-methyl methacrylate copolymer, an ethylene-methyl acrylate copolymer, an ethylene-ethyl acrylate copolymer, and an ethylene-butyl acrylate copolymer is more preferable.

Further, two or more kinds of olefin resins, such as ethylene and propylene may also be used in combination. A content of the olefin resin in the thermoplastic polyolefin elastomer is preferably from 50% by mass to 100% by mass.

The number average molecular weight of the thermoplastic polyolefin elastomer is preferably from 5,000 to 10,000,000. When the number average molecular weight of the thermoplastic polyolefin elastomer is from 5,000 to 10,000,000, the mechanical properties of a thermoplastic resin material is sufficient, and processability thereof is also superior. From the same viewpoints, the number average molecular weight of the thermoplastic polyolefin elastomer is more preferably from 7,000 to 1,000,000, and particularly preferably from 10,000 to 1,000,000. In this case, the mechanical properties and processability of the thermoplastic resin material can be further improved. Meanwhile, the number average molecular weight of the polymer that forms the soft segment is preferably from 200 to 6,000, from viewpoints of toughness and low temperature flexibility. Further, the mass ratio (x:y) of the hard segment (x) to the soft segment (y) is preferably from 50:50 to 95:15, and more preferably from 50:50 to 90:10, from the viewpoint of formability.

The thermoplastic polyolefin elastomer can be synthesized through copolymerization according to a known method.

Furthermore, as the thermoplastic polyolefin elastomer, a product obtained by modifying a thermoplastic polyolefin elastomer with an acid may also be used.

The "product obtained by modifying a thermoplastic polyolefin elastomer with an acid" means a product obtained by binding an unsaturated compound having an acidic group, such as a carboxylic acid group, a sulfuric acid group, or a phosphoric acid group, to a thermoplastic polyolefin elastomer.

Regarding the binding of the unsaturated compound having an acidic group, such as a carboxylic acid group, a sulfuric acid group, or a phosphoric acid group, to the thermoplastic polyolefin elastomer, for example, binding (for example, graft polymerization) of an unsaturated bond moiety of an unsaturated carboxylic acid (for example, generally, maleic anhydride), as the unsaturated compound having an acidic group, to the thermoplastic polyolefin elastomer is described.

From the viewpoint of inhibiting deterioration of the thermoplastic polyolefin elastomer, the unsaturated compound having an acidic group is preferably an unsaturated compound having a carboxylic acid group, which is a weak acid group. Examples of the unsaturated compound having an acidic group include acrylic acid, methacrylic acid, itaconic acid, crotonic acid, isocrotonic acid, maleic acid, and the like.

As a commercially available product for the thermoplastic polyolefin elastomer, for example, "TAFMER" series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, P-0680, and the like) manufactured by Mitsui Chemicals, Inc., "NUCREL" series (for example, AN4214C, AN4225C, AN42115C, NO903HC, N0908C, AN42012C, N410, N1050H, N1108C, N1110H, N1207C, N1214, AN4221C, N1525, N1560, NO200H, AN4228C, AN4213C, N035C, and the like), and "ELVALOY AC" series (for example, 1125AC, 1209AC, 1218AC, 1609AC, 1820AC, 1913AC, 2112AC, 2116AC, 2615AC, 2715AC, 3117AC, 3427AC, 3717AC, and the like), all manufactured by Dupont-Mitsui Polychemicals Co., Ltd., "ACRYFT" series, "EVATATE" series, and the like, all manufactured by Sumitomo Chemical Co., Ltd., "ULTRATHENE" series, and the like, all manufactured by Tosoh Corporation, "PRIME TPO" series (for example, E-2900H, F-3900H, E-2900, F-3900, J-5900, E-2910, F-3910, J-5910, E-2710, F-3710, J-5910, E-2740, F-3740, R110MP, R110E, T310E, M142E, and the like) manufactured by Prime Polymer Co., Ltd., and the like may also be used.

[Thermoplastic Resin]

—Thermoplastic Polyester Resin—

An example of the thermoplastic polyester resin may be a polyester that forms the hard segment of the thermoplastic polyester elastomer described above.

Specific examples of the thermoplastic polyester resin may include: aliphatic polyesters such as polylactic acid, polyhydroxy-3-butylbutyric acid, polyhydroxy-3-hexylbutyric acid, poly(ε-caprolactone), polyenantholactone, polycaprolactone, polybutylene adipate, or polyethylene adipate; aromatic polyesters such as polyethylene terephthalate, polybutylene terephthalate, polyethylene naphthalate, or polybutylene naphthalate; and the like. Among these, polybutylene terephthalate is preferable as the thermoplastic polyester resin, from the viewpoints of thermal resistance and processability.

As a commercially available product for the thermoplastic polyester resin, for example, "DURANEX" series (for example, 2000, 2002, and the like) manufactured by Polyplastics Co., Ltd., "NOVADURAN" series (for example, 5010R5, 5010R3-2, and the like) manufactured by Mitsubishi Engineering-Plastics Corporation, "TORAYCON" series (for example, 1401X06, 1401X31, and the like) manufactured by TORAY INDUSTRIES, INC., and the like may be used.

—Thermoplastic Polyamide Resin—

An example of the thermoplastic polyamide resin may be a polyamide that forms the hard segment of the thermoplastic polyamide elastomer described above.

Specific examples of the thermoplastic polyamide resin may include: a polyamide (amide 6) being obtained by ring-opening polycondensation of ε-caprolactam; a polyamide (amide 11) being obtained by ring-opening polycondensation of undecane lactam; a polyamide (amide 12) being obtained by ring-opening polycondensation of lauryl lactam; a polyamide (amide 66) being obtained by polycondensation of a diamine and a dibasic acid; a polyamide (amide MX) containing meta-xylene diamine as a structural unit; and the like.

The amide 6 can be represented, for example, by $\{CO-(CH_2)_5-NH\}_n$. The amide 11 can be represented, for example, by $\{CO-(CH_2)_{10}-NH\}_n$. The amide 12 can be represented, for example, by $\{CO-(CH_2)_{11}-NH\}_n$. The amide 66 can be represented, for example, by $\{CO(CH_2)_4CONH(CH_2)_6NH\}_n$. The amide MX can be represented, for example, by the following Structural Formula (A-1). Here, n represents the number of repeating units.

(A-1)

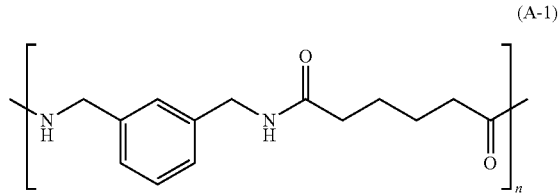

As a commercially available product for the amide 6, for example, "UBE NYLON" series (for example, 1022B, 1011FB, and the like) manufactured by UBE INDUSTRIES, LTD. may be used. As a commercially available product for the amide 11, for example, "Rilsan B" series manufactured by ARKEMA S.A. may be used. As a commercially available product for the amide 12, for example, "UBE NYLON" series (for example, 3024U, 3020U, 3014U, and the like) manufactured by UBE INDUSTRIES, LTD. may be used. As a commercially available product for the amide 66, for example, "Leona" series (for example, 13005, 17005, and the like) manufactured by Asahi Kasei Corporation may be used. As a commercially available product for the amide MX, for example, "MX NYLON" series (for example, 56001, 56021, 56011, and the like) manufactured by MITSUBISHI GAS CHEMICAL COMPANY, INC. may be used.

The thermoplastic polyamide resin may be a homopolymer being composed of the above structural unit, or may be a copolymer of the above structural unit and other monomer. In the case of a copolymer, it is preferable that the content of above structural unit in the thermoplastic polyamide resin is 40% by mass or higher.

—Thermoplastic Polyolefin Resin—

An example of the thermoplastic polyolefin resin may be a polyolefin that forms the hard segment of the thermoplastic polyolefin elastomer described above.

Specific examples of the thermoplastic polyolefin resin may include a thermoplastic polyethylene resin, a thermoplastic polypropylene resin, a thermoplastic polybutadiene resin, and the like. Among these, a thermoplastic polypropylene resin is preferable as the thermoplastic polyolefin resin, from the viewpoints of thermal resistance and processability.

Specific examples of the thermoplastic polypropylene resin include a propylene homopolymer, a propylene-α-olefin random copolymer, a propylene-α-olefin block copolymer, and the like. Examples of the α-olefin include α-olefins having from about 3 to about 20 carbon atoms, such as propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, 1-hexadecene, 1-octadecene, or 1-eicosene, and the like.

[Additional Components]

The resin member may contain additional components, such as additives, in addition to the resin, within a range in which the effects are not impaired. Examples of the additional components include rubbers, various kinds of fillers (for example, silica, calcium carbonate, clay, and the like), anti-aging agents, oils, plasticizers, colorants, weather proofing agents, and the like.

(Rubber Member)

The rubber member includes rubber, a filler having a silanol group, and a silane coupling agent, such that the content of the filler and the content of the silane coupling agent are each within the above-described range. When this rubber member including a filler and a silane coupling agent is brought into contact with the treated surface in the resin member, the adhesiveness between the two members is improved.

Filler Having Silanol Group

Examples of the filler having a silanol group, which is contained in the rubber member, include particles of silica, glass (for example, glass fiber, glass beads, or the like) or the like.

Above all, as the filler having a silanol group, silica particles are preferable, from the viewpoint of improvement in the adhesiveness.

Silica includes not only silicon dioxide ($SiO_2$) in a narrow sense, but also silicic acid-based compounds, and includes, in addition to silicic acid anhydride, hydrous silicic acid, and silicates such as calcium silicate, or aluminum silicate. The silica is not particularly limited, and those used in commercially available rubber compositions and the like can be used. The aggregation state of the silica is not particularly limited, and precipitated silica, gelatinized silica, dry silica, and colloidal silica are also included.

In the embodiment of the disclosure, it is preferable to use a hydrophilic silica, from the viewpoint of the number of silanol groups on the surface.

Here, that the silica is "hydrophilic" means that the water content (that is, the loss on drying) defined in JIS-K1150 (1994) is 10% by mass or lower.

The BET specific surface area of the filler having a silanol group is preferably from 150 $m^2/g$ to 400 $m^2/g$. The BET specific surface area of the filler is more preferably from 180 $m^2/g$ to 350 $m^2/g$ and still more preferably from 200 $m^2/g$ to 300 $m^2/g$.

The BET specific surface area of a filler having a silanol group is an index of the particle diameter of the filler. That is, when the BET specific surface area is 150 $m^2/g$ or more, the particle diameter of the filler is not too large, the silanol groups are sufficiently exposed on the surface of the rubber member, and interaction with respect to the resin member occurs favorably, and therefore, the adhesiveness between the resin member and the rubber member is further improved. Whereas, when the BET specific surface area is 400 $m^2/g$ or less, the particle diameter of the filler is not too small, aggregation of the filler is suppressed, and therefore, a high dispersibility is obtained.

The BET specific surface area of the filler having a silanol group is measured according to the following method.

The BET specific surface area is measured using a BET specific surface area measuring device (trade name; SA3100, manufactured by Beckman Coulter, Inc.). In this process, the amount of the sample to be used is preferably from 1.0 g to 3.0 g. When the amount of the sample is less than 1.0 g, the weighing error is large, and there is concern that the accuracy of the BET specific surface area becomes low. When the amount of the sample exceeds 3.0 g, it takes time for the pretreatment of the sample, the adsorbed water cannot be sufficiently removed, and there is concern that the value of the BET specific surface area varies. The amount of the sample is more preferably from 1.2 g to 2.0 g.

Further, after weighing the sample but before measuring the BET specific surface area of the sample, it is preferable that the sample is subjected to drying treatment under heating. The drying treatment is performed for removing water and drying the sample. In this drying treatment, it is preferable to set the temperature and time according to the sample to be measured. When measuring a filler having thermal resistance, it is preferable to perform the treatment at a temperature equal to or lower than the heat resistant temperature, and it is preferable to perform a heat vacuum treatment at a temperature of from 105° C. to 300° C. for one hour to 10 hours.

The content of the filler having a silanol group in the rubber member is as described above.

Silane Coupling Agent

An example of the silane coupling agent is a compound in which a group equipped with a reactive group, that shows reactivity with respect to an organic material, and an alkoxy group are bonded to a Si atom.

Note that, examples of the alkoxy group include a methoxy group, an ethoxy group, and the like.

Examples of the reactive group include a vinyl group, an epoxy group, a styryl group (that is, a vinylphenyl group), an acryl group, a methacryl group, an amino group, an ureido group, an isocyanate group, an isocyanurate group, a mercapto group, a triazinedithiol group, a and the like.

Examples of the silane coupling agent contained in the rubber member include the following compounds.

A polysulfide-based silane coupling agent having two or more sulfurs (for example, bis-(trialkoxysilylalkyl)-polysulfide, such as bis-(3-triethoxysilyl) propyl)-disulfide, bis-(3-triethoxysilyl) propyl)-tetrasulfide, or bis-(triethoxysilylpropyl)-polysulfide), N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 4-aminobutyltriethoxysilane, 11-aminoundecyltriethoxysilane, 3-triethoxysilyl-N-(1,3-dimethyl-butylidene) propylamine, N-phenyl-3-aminopropyltrimethoxysilane, N-(vinylbenzyl)-2-aminoethyl-3-aminopropyltrimethoxysilane hydrochloride, tris-(trimethoxysilylpropyl) isocyanurate, 3-isocyanatopropyltrimethoxysilane, 3-isocyanatopropyltriethoxysilane, 3-isocyanatopropyltriisopropoxysilane, (isocyanatomethyl)methyldimethoxysilane, (3-triethoxysilylpropyl)-t-butyl carbamate, triethoxysilylpropylenyl carbamate, trimethoxysilylpropyl succinic anhydride, triethoxysilylpropyl succinic anhydride, vinyltrimethoxysilane, vinyltriethoxysilane, vinyltriisopropoxysilane, vinyl-t-butoxysilane, vinyltris(2-methoxyethoxy) silane, allyltrimethoxysilane, allyltriethoxysilane, butenyltrimethoxysilane, butenyltriethoxysilane, hexenyltrimethoxysilane, hexenyltriethoxysilane, octenyltrimethoxysilane, octenyltriethoxysilane, dodecenyltrimethoxysilane, dodecenyltriethoxysilane, styretyltrimethoxysilane, (bicycloheptenyl)triethoxysilane (norbornenetriethoxysilane), 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-glycidoxypropyltrimethoxysilane, 5,6-epoxyhexyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, 3-ureidopropyltrialkoxysilane, 3-mercaptopropylmethyldimethoxysilane, 3-mercaptopropyltrimethoxysilane, 3-mercaptopropyltriethoxysilane, 11-mercaptoundecyltrimethoxysilane, 11-mercaptoundecyltriethoxysilane, mercaptomethylmethyldiethoxysilane, 3-mercaptopropyltrimethoxysilane, 3-mercaptopropyltriisopropoxysilane, 3-mercaptopropyltri-t-butoxysilane, and the like.

As the silane coupling agent, it is preferable to use a polysulfide-based silane coupling agent having two or more sulfurs, from the viewpoint of the dispersibility of the filler having a silanol group.

Above all, from the viewpoint of improvement in adhesiveness and the viewpoint of reactivity with respect to the rubber, the following compounds are preferable as the silane coupling agent.

Namely, bis-(3-triethoxysilyl)propyl)-disulfide, bis-(3-triethoxysilyl)propyl)-tetrasulfide, bis-(triethoxysilylpropyl)-polysulfide, and 3-mercaptopropyltriethoxysilane are preferable.

These silane coupling agents may be used singly or in a combination of two or more kinds thereof.

The content of the silane coupling agent in the rubber member is as described above.

Rubber

The rubber member in the embodiment of the disclosure includes rubber.

The content of the rubber with respect to the total amount of the rubber member is not particularly limited, but is preferably 30% by mass or higher, more preferably 40% by mass or higher, and still more preferably 50% by mass or higher. Meanwhile, the upper limit value is preferably 90% by mass or lower, more preferably 80% by mass or lower, and still more preferably 70% by mass or lower.

The rubber contained in the rubber member is not particularly limited, and natural rubbers and various synthetic rubbers, which are used in conventionally known rubber blending, can be used singly or by mixing two or more kinds thereof. For example, a rubber as described below, or a rubber blend of two or more kinds of these can be used.

The natural rubber may be a sheet rubber or a block rubber, and all of RSS #1 to #5 can be used.

As the synthetic rubber, various diene-based synthetic rubbers, diene-based copolymer rubbers, special rubbers, modified rubbers, or the like can be used. Specific examples thereof include: butadiene-based polymers such as polybutadiene (BR), a copolymer of butadiene and an aromatic vinyl compound (for example, SBR, NBR, or the like), or a copolymer of butadiene and another diene-based compound; isoprene-based polymers such as polyisoprene (IR), a copolymer of isoprene and an aromatic vinyl compound, or a copolymer of isoprene and another diene-based compound; chloroprene rubbers (CR), butyl rubbers (IIR), halogenated butyl rubbers (X-IIR); ethylene-propylene based copolymer rubbers (EPM), ethylene-propylene-diene based copolymer rubbers (EPDM), mixtures of any of these, and the like.

Further, additional components such as additives may be added to the rubber member, depending on the purpose.

Examples of the additives include a reinforcing material such as carbon black, a filler, a vulcanization agent, a vulcanization accelerator, a fatty acid or a salt thereof, a metal oxide, a process oil, an anti-aging agent, and the like. Any of these may be blended as appropriate.

It is preferable that the rubber member is in an unvulcanized state, the unvulcanized rubber is molded into a desired shape, and is crosslinked by heating.

(Second Rubber Member)

The resin-rubber composite according to the embodiment of the disclosure may have a second rubber member which is in contact with the rubber member.

The second rubber member includes rubber. As examples of the rubber to be used, those exemplified as the rubber contained in the rubber member described above are described.

Further, additional components such as additives may be added to the second rubber member, depending on the purpose. As examples of the additives, those exemplified as the additives to be contained in the rubber member described above are described.

<Tire>

The tire according to the embodiment of the disclosure has the above resin-rubber composite according to the embodiment of the disclosure.

In the case of using the resin-rubber composite in a tire, examples of a combination of the resin member and the rubber member include the following combinations.

In a case in which the resin member is "a belt layer", at least one member selected from the group consisting of "a tread, a tire frame, and a rubber sheet adhered to the surface of the belt layer" is described as the rubber member.

In a case in which the resin member is "a bead member", at least one member selected from the group consisting of "a tire frame, and a rubber sheet adhered to the surface of the bead member" is described as the rubber member.

In a case in which the resin member is "a tire frame", at least one member selected from the group consisting of "a tread, a belt layer, a bead member, and a rubber sheet adhered to the surface of the tire frame" is described as the rubber member.

In a case in which the resin member is "a belt cord", at least one member selected from the group consisting of "a cord coating layer that covers the belt cord, and a rubber sheet adhered to the surface of the belt cord" is described as the rubber member.

In a case in which the resin member is "a bead wire", at least one member selected from the group consisting of "a wire coating layer that covers the bead wire, and a rubber sheet adhered to the surface of the bead wire" is described as the rubber member.

Note that, the above "tire frame" as the rubber member may be replaced by a member that forms the skeleton of a tire, such as a carcass (for example, a carcass consisting of a carcass ply in which the periphery of a plurality of wires is covered with rubber), which corresponds to the rubber member.

Further, in a case in which the resin-rubber composite has a resin member, a rubber member that is in contact with the resin member, and a second rubber member that is in contact with this rubber member, the following combinations are described.

In a case in which the resin member is "a belt layer", "a rubber sheet" is described as the rubber member, and at least one member selected from the group consisting of "a tread, a tire frame, and a side rubber" is described as the second rubber member.

In a case in which the resin member is "a bead member", "a rubber sheet" is described as the rubber member, and at least one member selected from the group consisting of "a tire frame and a side rubber" is described as the second rubber member.

In a case in which the resin member is "a tire frame", "a rubber sheet" is described as the rubber member, and at least one member selected from the group consisting of "a tread, a belt layer, a bead member, and a side rubber" is described as the second rubber member.

In a case in which the resin member is "a belt cord", "a rubber sheet" is described as the rubber member, and "a cord coating layer" is described as the second rubber member.

In a case in which the resin member is "a bead wire", "a rubber sheet" is described as the rubber member, and "a wire coating layer" is described as the second rubber member.

Note that, the above "tire frame" as the second rubber member may be replaced by a member that forms the skeleton of a tire, such as a carcass (for example, a carcass consisting of a carcass ply in which the periphery of a plurality of wires is covered with rubber), which corresponds to the second rubber member.

Here, the configuration of the tire according to the embodiment of the disclosure is explained by way of specific examples and by using drawings. The sizes of the members in each of the drawings are conceptual, and the relative size relationship between the members is not limited thereto. Further, through all of the drawings, the same symbol is attached to the member that has substantially the same function, and repeated explanation may be omitted.

First, as the first embodiment, a tire in which each of the tire frame and the belt layer corresponds to the resin member will be described as an example.

First Embodiment

FIG. 1 is a cross-sectional view of a tire according to the first embodiment, taken along the tire width direction.

In the tire according to the first embodiment, a tire casing 17 (an example of a tire frame) corresponds to the resin member. In the first embodiment, in the tire 200, as shown in FIG. 1, a belt being obtained by covering a belt cord 26A with a coating resin 26B is wound on the outer peripheral surface of a crown portion 16 of the tire casing 17 in the circumferential direction to form a belt layer 26. This belt layer 26 also corresponds to the resin member. This belt layer 26 constitutes the outer peripheral portion of the tire casing 17, and reinforces the rigidity of the crown portion 16 in the circumferential direction.

Note that, in the tire casing 17 and the belt layer 26, each of which corresponds to the resin member, at least the surface that is in contact with the cushion rubber 28 is a treated surface that has been treated through the surface treatment described above.

In the tire casing 17 that is a resin member, the melting temperature of the resin is, for example, from about 100° C. to about 350° C. From the viewpoints of the durability and productivity of the tire, the melting temperature of the resin is preferably from about 100° C. to about 250° C., and more preferably from 120° C. to 250° C.

The tensile modulus of elasticity, which is defined in JIS K7113: 1995, of the tire frame (for example, the tire frame 17) itself is preferably from 50 MPa to 1,000 MPa, more preferably from 50 MPa to 800 MPa, and particularly preferably from 50 MPa to 700 MPa. When the tensile modulus of elasticity is from 50 MPa to 1,000 MPa, the tire can be efficiently fitted to a rim while maintaining the shape of the tire frame.

The tensile strength, which is defined in JIS K7113 (1995), of the tire frame (for example, the tire frame 17) itself is, generally, from about 15 MPa to about 70 MPa, preferably from 17 MPa to 60 MPa, and more preferably from 20 MPa to 55 MPa.

The tensile strength at yield, which is defined in JIS K7113 (1995), of the tire frame (for example, the tire frame 17) itself is preferably 5 MPa or higher, more preferably from 5 MPa to 20 MPa, and particularly preferably from 5 MPa to 17 MPa. When the tensile strength at yield is 5 MPa or higher, the tire can endure deformation caused by a load applied to the tire during traveling or the like.

The tensile elongation at yield, which is defined in JIS K7113 (1995), of the tire frame (for example, the tire frame 17) itself is preferably 10% or higher, more preferably from 10% to 70%, and particularly preferably from 15% to 60%. When the tensile elongation at yield is 10% or higher, a large elastic region is provided, so that favorable rim fittability can be attained.

The tensile elongation at break, which is defined in JIS K7113 (1995), of the tire frame (for example, the tire frame 17) itself is preferably 50% or higher, more preferably 100% or higher, particularly preferably 150% or higher, and most preferably 200% or higher. When the tensile elongation at break is 50% or higher, favorable rim fittability can be attained, and the tire can be made unlikely to rupture at collision.

The deflection temperature under load (under a load of 0.45 MPa), which is defined in ISO75-2 or ASTM D648, of the tire frame (for example, the tire frame 17) itself is preferably 50° C. or higher, more preferably from 50° C. to 150° C., and particularly preferably from 50° C. to 130° C. When the deflection temperature under load is 50° C. or higher, deformation of the tire frame can be suppressed even in a case in which vulcanization is performed in the production of the tire.

This belt layer 26 is formed by covering the belt cord 26A, whose rigidity is higher than the rigidity of the resin that forms the tire casing 17, with the coating resin 26B, which is different from the resin that forms the tire casing 17. Further, with regard to the belt layer 26, the belt layer 26 and the tire casing 17 are joined (for example, welded or adhered to each other using an adhesive) at the contacting part with the crown portion 16.

Further, a cushion rubber 28 is joined so as to be in contact with a region which is not covered with the belt layer 26 among the outer peripheral surface of the belt layer 26 and the outer peripheral surface of the tire casing 17. Moreover, a tread layer 30 containing rubber is further joined onto the outer peripheral surface of the cushion rubber 28. The tread made of rubber is formed by these cushion rubber 28 and tread layer 30, and the cushion rubber 28 corresponds to the rubber member. In the tread layer 30, a tread pattern (not shown) composed of plural grooves is formed on the grounding face that comes into contact with a road surface.

Next, a method for producing the tire according to the first embodiment, the tire being equipped with the tire casing 17 and the belt layer 26, each of which corresponds to the resin member, will be described.

Tire Casing Forming Step

First, a tire casing half part (that is, a half on one side of the tire casing having a form of the tire casing that has been cut at the central part in the tire width direction) is formed, for example, using a resin material according to a method such as extrusion molding. Subsequently, the tire casing half parts are arranged to face each other, and by joining the tire casing half parts with each other by, for example, a method of pressing at a temperature equal to or higher than the melting temperature of the resin material that constitutes the tire casing, a tire casing 17 is formed.

Belt Layer Winding Step

As a method of forming a belt layer 26 on the crown portion 16 of the tire casing 17, for example, while rotating the tire casing 17, a belt (that is, a member being obtained by covering the belt cord 26A with the coating resin 26B) which has been wound on a reel is unwound, and this belt is wound around the crown portion 16 for a predetermined number of times, to form a belt layer 26. Note that, a coating resin 26B may be welded to the tire casing 17 by heating and pressing by applying pressure.

Surface Treatment Step

With respect to a region which is not covered with the belt layer 26, among the outer peripheral surface that is in contact with the cushion rubber 28 in the belt layer 26 and the outer peripheral surface of the tire casing 17, and which is in contact with the cushion rubber 28, surface treatment is performed by, at least, the method described above. However, the timing when the surface treatment is performed is not particularly limited. For example, the treatment may be performed with respect to the tire casing 17 and the belt layer 26, all together, after the formation of the belt layer 26. Alternatively, first, the treatment may be performed with respect to the tire casing 17, before forming the belt layer 26, and then, after the formation of the belt layer 26, the treatment may be performed once again with respect to the belt layer 26.

Layering Step and Vulcanization Step

Next, the cushion rubber 28 in the unvulcanized state is wound once so as to be in contact with a region which is not covered with the belt layer 26 among the outer peripheral surface of the belt layer 26 and the outer peripheral surface of the tire casing 17. Note that, a filler having a silanol group is incorporated in the cushion rubber 28 that corresponds to the rubber member. Thereafter, a tread layer 30 in the vulcanized state, half vulcanized state, or unvulcanized state is wound once on this cushion rubber 28. Then, vulcanization is performed, thereby obtaining a tire according to the first embodiment.

Note that, a sealing layer 24, which is softer than the resin material used in tire casing 17, may be provided on the bead portion 12 in the tire casing 17, by using an adhesive or the like.

In the tire 200 according to the first embodiment, a filler having a silanol group is incorporated in the cushion rubber 28 that corresponds to the rubber member, and the region where the tire casing 17 and the belt layer 26, each of which corresponds to a resin member, contact the cushion rubber 28 has been subjected to a surface treatment by the method described above. Thus, without using an adhesive between the tire casing 17 and the cushion rubber 28, and between the belt layer 26 and the cushion rubber 28, an excellent adhesiveness between the tire casing 17 as well as the belt layer 26 and the cushion rubber 28 that constitutes the tread is obtained.

(Variation)

In the tire 200 according to the first embodiment shown in FIG. 1, a tread is formed on the outer peripheral surface of the tire casing 17 by layering the cushion rubber 28 and the tread layer 30; however, the present disclosure in not limited to this configuration, and a configuration in which a cushion rubber 28 is not disposed may be adopted. In this case, the tread layer 30 that constitutes the tread corresponds to the rubber member, and a filler having a silanol group is incorporated in this tread layer 30.

Further, in the tire 200 according to the first embodiment shown in FIG. 1, a mode in which the cushion rubber 28 is in direct contact with the tire casing 17 and the belt layer 26 is shown; however, the present disclosure in not limited to this mode, and a rubber sheet that corresponds to the rubber member may be disposed between the cushion rubber 28 and the tire casing 17 as well as the belt layer 26. In this case, the rubber sheet corresponds to the rubber member, and a filler having a silanol group is incorporated in this rubber sheet. Further, the cushion rubber 28 corresponds to the second rubber member, and it is not necessary that a filler having a silanol group is incorporated in this cushion rubber 28.

In a case in which a rubber sheet that corresponds to the rubber member is disposed between the tire casing 17 as well as the belt layer 26, each of which corresponds to the resin member, and the cushion rubber 28 that corresponds to the second rubber member, the thickness of this rubber sheet is preferably, for example, from 0.1 µm to 100 mm, and more preferably from 1 µm to 2 mm.

Subsequently, as the second embodiment, an example of a tire, in which each of the bead member, the belt cord, and the bead wire corresponds to the resin member, will be described.

Second Embodiment

FIG. 2 is a cross-sectional view of a half of a tire, showing one side of a cut section when cutting the tire 110 according to the second embodiment along the tire width direction. In the figure, the arrow TW indicates the width direction (tire width direction) of the tire 110, and the arrow TR indicates the radial direction (tire radial direction) of the tire 110.

As shown in FIG. 2, the tire 110 includes: a pair of bead portions 112 (note that, in FIG. 2, only a bead portion 112 on one side is shown); a pair of tire side portions 114 that extend from the pair of bead portions 112 toward the outer side in the tire radial direction; and a tread portion 116 that extends from one tire side portion 114 to the other tire side portion 114.

The tire 110 shown in FIG. 2 is equipped with a tire casing 140 that corresponds to the tire frame. The tire casing 140 corresponds to the rubber member, and is formed by using rubber, and moreover, contains a filler having a silanol group. The tire casing 140 is configured to include a bead portion 112, a tire side portion 114, and a tread portion 116.

Note that, in FIG. 2, the tire casing 140 that corresponds to the rubber member may be replaced by a member that forms the skeleton of a tire, such as a carcass (for example, a carcass consisting of a carcass ply in which the periphery of a plurality of wires is covered with rubber), which corresponds to the rubber member.

Further, a protective layer 122 is provided on a part of the outer side in the tire width direction of the tire side portion 114 and the bead portion 112, the inner side in the tire radial direction of the bead portion 112, and the inner side in the tire width direction of the bead portion 112. The tire casing 140 may be a tire casing in which the bead portion 112, the tire side portion 114, and the tread portion 116 are formed integrally through the same step, or may be formed by combining the members which are respectively formed through different steps. From the viewpoint of production efficiency, it is preferable that the tire casing is a tire casing in which the above members are formed integrally.

Further, a bead filler 120 that extends from the bead core 118 toward the outer side in the tire radial direction along the protective layer 122 is embedded in the bead portion 112. The bead filler 120 corresponds to the resin member, and the surface that is in contact with the tire casing 140 is a treated surface that has been treated by the surface treatment described above.

The bead portion 112 is a moiety that comes into contact with a rim (not shown), and a circular bead core 118 that extends along the tire circumferential direction is embedded therein. The form that the bead core 118 can take is described below.

The protective layer 122 is provided, for the purpose of, for example, enhancing the airtight property between the tire casing 140 and the rim, and is constituted of a material such as a rubber which is softer than the tire casing 140 and which has a high climatic resistance. However, the protective layer may be omitted.

The tread portion 116 is a moiety that corresponds to the grounding face of the tire 110, and is provided with a belt layer 124A. Further, a tread layer 130 is provided on the belt layer 124A via a cushion rubber 124B. The form that the belt layer 124A can take is described below.

Production of Tire

The method for preparing the tire casing 140 is not particularly limited. For example, the tire casing may be prepared by preparing tire casing half parts being in a state in which the tire casing 140 is divided by the tire equatorial plane (the plane represented by CL in FIG. 2), respectively, in accordance with an extrusion molding method (for example, an injection molding method) or the like, and then bonding the tire casing half parts to each other at the equatorial plane. Further, in a case in which the tire casing 140 that corresponds to the rubber member has been replaced by a carcass, a carcass prepared by using a conventionally known method may be used.

Figure 3A:
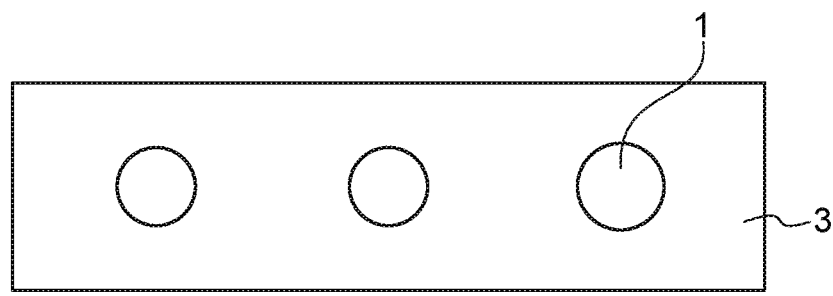
FIG. 3A is a schematic diagram of a cut section, showing one form of a bead core in an embodiment of the present disclosure, when cutting vertically to the length direction of a bead wire.

As the method of forming a belt layer 124A on the tread portion 116 in the tire casing 140, for example, while rotating the tire casing 140, a belt (a member being obtained by covering the belt cord 1 shown in FIG. 3A with the cord coating layer 3) that has been wound up on the reel is unwound, and this belt is wound around the crown portion 16 for a predetermined number of times, thereby forming a belt layer 124A. Note that, a cord coating layer 3 may be welded to the tire casing 140 by heating or pressing by applying pressure.

As the method of forming a bead filler 120 and a bead core 118 on the bead portion 112 in the tire casing 140, for example, the formation may be performed by embedding a bead filler 120 that has been formed in advance and a circular member for the bead core 118 in the bead portion 112 according to a known method.

In the tire 110 according to the second embodiment, a filler having a silanol group is incorporated in the tire casing 140 that corresponds to the rubber member, and the region where the bead filler 120 (an example of the bead member) that corresponds to the resin member contacts the tire casing 140 is subjected to surface treatment by the method described above. Thus, without using an adhesive between the tire casing 140 and the bead filler 120, an excellent adhesiveness between the tire casing 140 and the bead filler 120 (an example of the bead member) is obtained.

(Variation)

In the tire 110 according to the second embodiment shown in FIG. 2, a mode in which the tire casing 140 is in direct contact with the bead filler 120 is shown; however, the present disclosure in not limited to this mode, and a rubber sheet that corresponds to the rubber member may be disposed between the tire casing 140 and the bead filler 120. In this case, the rubber sheet corresponds to the rubber member, and a filler having a silanol group is incorporated in this rubber sheet. Further, the tire casing 140 corresponds to the second rubber member, and it is not necessary that a filler having a silanol group is incorporated in this tire casing 140.

In a case in which a rubber sheet that corresponds to the rubber member is disposed between the bead filler 120 that corresponds to the resin member, and the tire casing 140 that corresponds to the second rubber member, the thickness of this rubber sheet is preferably, for example, from 0.1 μm to 100 mm, and more preferably from 1 μm to 2 mm.

(Form of Bead Core)

Next, the form that the bead core 118 shown in FIG. 2 can take is explained by way of plural examples.

FIG. 3A is a diagram schematically showing a cross section when a part of the bead core 118 is cut vertically with respect to the length direction of the bead wire 1. In FIG. 3A, a wire coating layer 3 is provided so as to be in direct contact with three bead wires 1. In the mode shown in FIG. 3A, the bead wire 1 corresponds to the resin member, and the surface that is in contact with the wire coating layer 3 is a treated surface that has been treated through the surface treatment described above. Further, the wire coating layer 3 corresponds to the rubber member, and is formed using a rubber, and moreover, contains a filler having a silanol group. Accordingly, without using an adhesive between the bead wire 1 and the wire coating layer 3, an excellent adhesiveness between the bead wire 1 and the wire coating layer 3 is obtained.

Note that, the production may be performed by stacking one bead wire 1 laterally and longitudinally, while performing thermal welding.

Further, the bead core 118 may have a rubber sheet 2 that is disposed between the bead wire 1 and the wire coating layer 3. In a part of the bead core 118 shown in FIG. 3B, a rubber sheet 2 is adhered to each of the surfaces of the three bead wires 1, and furthermore, a wire coating layer 3 is provided on the surface. Note that, this rubber sheet 2 corresponds to the rubber member, and a filler having a silanol group is incorporated in this rubber sheet 2. Further, the wire coating layer 3 corresponds to the second rubber member, and it is not necessary that a filler having a silanol group is incorporated in this wire coating layer 3. Accordingly, without using an adhesive between the bead wire 1 and the rubber sheet 2, an excellent adhesiveness between the bead wire 1 and the rubber sheet 2 is obtained.

Figure 3B:
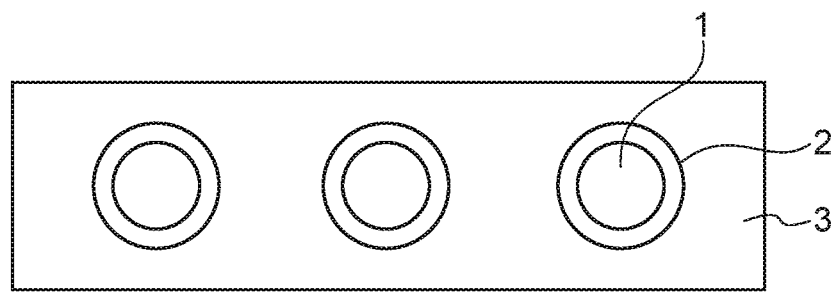
FIG. 3B is a schematic diagram of a cut section, showing another form of a bead core in an embodiment of the present disclosure, when cutting vertically to the length direction of a bead wire.

Note that, in FIG. 3A and FIG. 3B, a mode in which three bead wires 1 are arranged in parallel is shown; however, the number of the bead wires may be two or less, or may be four or more.

Further, the bead core 118 shown in FIG. 2 has a form in which the three bead wires 1 and the wire coating layer 3 (and further, the rubber sheet 2 in FIG. 3B) shown in any of FIG. 3A and FIG. 3B are layered in three layers. However, the bead core 118 may be used as one layer, or may be used by layering two or more layers. In this case, it is preferable that the wire coating layers are welded to each other.

Note that, the form that the bead core 118 can take is explained with reference to FIG. 3A and FIG. 3B; however, the disclosure is not limited to this configuration.

The method of preparing a bead core 118 is not particularly limited. For example, in the case of preparing a bead core 118 shown in FIG. 3B, the surface treatment described above is applied to the bead wire 1 that is the resin member, and then using a rubber material for forming a rubber sheet 2 (note that, the rubber material contains a filler having a silanol group) and a rubber material for forming a wire coating layer 3, a bead core can be prepared according to an extrusion molding method.

(Form of Belt Layer)

Next, the form that the belt layer 124A shown in FIG. 2 can take is explained.

For example, a configuration that is substantially similar to the configuration of the bead core 118 shown in FIG. 3A is described. That is, a configuration in which a cord coating layer is provided so as to be in direct contact with the three belt cords is described. In this case, the belt cord corresponds to the resin member, and the surface that is in contact with the cord coating layer is the treated surface that has been treated through the surface treatment described above. Further, the cord coating layer corresponds to the rubber member, and is formed using a rubber, and moreover, contains a filler having a silanol group. Accordingly, without using an adhesive between the belt cord and the cord coating layer, an excellent adhesiveness between the belt cord and the cord coating layer is obtained.

Further, the belt layer 124A may have a rubber sheet that is disposed between the belt cord and the cord coating layer. As this form, a configuration that is substantially similar to the configuration of the bead core 118 shown in FIG. 3B is described. That is, a configuration in which a rubber sheet is adhered to each of the surfaces of the three belt cords, and furthermore, a cord coating layer is provided on a surface thereof is described. In this case, the rubber sheet corresponds to the rubber member, and a filler having a silanol group is incorporated in this rubber sheet. Further, the cord coating layer corresponds to the second rubber member, and it is not necessary that a filler having a silanol group is incorporated in this cord coating layer. Accordingly, without using an adhesive between the belt cord and the rubber sheet, an excellent adhesiveness between the belt cord and the rubber sheet is obtained.

Note that, a mode in which three belt cords are arranged in parallel is described; however, the number of the belt cords may be two or less, or may be four or more.

Further, the belt layer 124A shown in FIG. 2 has a form in which the three belt cords and the cord coating layer (and further, a rubber sheet, if necessary) are layered in one layer. However, the belt layer 124A may be used by layering two or more layers. In this case, it is preferable that the cord coating layers are welded to each other.

Note that, the form that the belt layer 124A can take is explained as described above; however the disclosure is not limited to this configuration.

Hereinabove, although the configurations of the tire according to the embodiments of the disclosure are described above by way of the first embodiment and the second embodiment, these embodiments are merely examples. In the embodiments of the disclosure, various modifications can be made without departing from the scope of the disclosure. Further, it goes without saying that the scope of rights of the disclosure is not limited to these embodiments.

As described above, according to the present disclosure, the following resin-rubber composite, tire, and method for producing the resin-rubber composite are provided.

<1> According to a first aspect of the present disclosure, a resin-rubber composite provided with:
  a resin member that has a treated surface, to which a surface treatment including a plasma treatment has been applied; and
  a rubber member that is disposed in contact with the treated surface of the resin member and that includes a rubber, a filler having a silanol group, and a silane coupling agent, with a filler content of from 30 phr to 100 phr with respect to 100 phr of the rubber, and a silane coupling agent content of from 2 parts by mass to 15 parts by mass with respect to 100 parts by mass of the filler, is provided.

<2> According to a second aspect of the present disclosure, the resin-rubber composite according to the first aspect, wherein at least one selected from the group consisting of a peroxy radical (—O—O·), a hydroperoxide group (—O—OH), a carbonyl group (—C(═O)—), an aldehyde group (—C(═O)—H), a carboxyl group (—C(═O)—OH), and a hydroxyl group (—OH) is introduced to the treated surface of the resin member by the surface treatment, is provided.

<3> According to a third aspect of the present disclosure, the resin-rubber composite according to the first aspect or the second aspect, wherein a contact angle of water on the treated surface of the resin member is from 20° to 98°, is provided.

<4> According to a fourth aspect of the present disclosure, the resin-rubber composite according to any one of the first aspect to the third aspect, wherein a BET specific surface area of the filler having a silanol group is from 150 m$^2$/g to 400 m$^2$/g, is provided.

<5> According to a fifth aspect of the present disclosure, the resin-rubber composite according to any one of the first aspect to the fourth aspect, wherein the filler having a silanol group includes silica, is provided.

<6> According to a sixth aspect of the present disclosure, the resin-rubber composite according to the fifth aspect, wherein the silica includes a hydrophilic silica, is provided.

<7> According to a seventh aspect of the present disclosure, the resin-rubber composite according to any one of the first aspect to the sixth aspect, wherein the silane coupling agent includes a polysulfide-based silane coupling agent having two or more sulfurs, is provided.

<8> According to an eighth aspect of the present disclosure, the resin-rubber composite according to any one of the first aspect to the seventh aspect, further having a second rubber member that is disposed in contact with the rubber member, is provided.

<9> According to a ninth aspect of the present disclosure, the resin-rubber composite according to any one of the first aspect to the eighth aspect, wherein the resin member includes at least one resin selected from the group consisting of a thermoplastic polyester elastomer, a thermoplastic polyester resin, a thermoplastic polyamide elastomer, a thermoplastic polyamide resin, a thermoplastic polystyrene elastomer, a thermoplastic polystyrene resin, a thermoplastic polyurethane elastomer, a thermoplastic polyurethane resin, a thermoplastic polyolefin elastomer, and a thermoplastic polyolefin resin, is provided.

<10> According to a tenth aspect of the present disclosure,
the resin-rubber composite according to the ninth aspect, wherein the resin member includes at least one resin selected from a thermoplastic polyester elastomer or a thermoplastic polyester resin, is provided.

<11> According to an eleventh aspect of the present disclosure,
a tire having the resin-rubber composite according to any one of the first aspect to the tenth aspect is provided.

<12> According to a twelfth aspect of the present disclosure,
the tire according to the eleventh aspect, having a belt layer as the resin member, and at least one member selected from a tread, a tire frame, or a rubber sheet adhered to the surface of the belt layer, as the rubber member, is provided.

<13> According to a thirteenth aspect of the present disclosure,
the tire according to the eleventh aspect, having a bead member as the resin member, and at least one member selected from a tire frame, or a rubber sheet adhered to the surface of the bead member, as the rubber member, is provided.

<14> According to a fourteenth aspect of the present disclosure,
the tire according to the eleventh aspect, having a tire frame as the resin member, and at least one member selected from a tread, a belt layer, a bead member, or a rubber sheet adhered to the surface of the tire frame, as the rubber member, is provided.

<15> According to a fifteenth aspect of the present disclosure,
the tire according to the eleventh aspect, wherein the resin-rubber composite is a belt layer having a belt cord as the resin member, and at least one member selected from a cord coating layer that covers the belt cord or a rubber sheet adhered to the surface of the belt cord, as the rubber member, is provided.

<16> According to a sixteenth aspect of the present disclosure,
the tire according to the eleventh aspect, wherein the resin-rubber composite is a bead core having a bead wire as the resin member, and at least one member selected from a wire coating layer that covers the bead wire or a rubber sheet adhered to the surface of the bead wire, as the rubber member, is provided.

<17> According to a seventeenth aspect of the present disclosure,
a method for producing a resin-rubber composite, the method including:
a surface treatment step of applying a surface treatment including a plasma treatment to at least a part of a surface of a resin member;
an adhesion step of disposing a rubber member, which includes a rubber, a filler having a silanol group, and a silane coupling agent, with a filler content of from 30 phr to 100 phr with respect to 100 phr of the rubber, and a silane coupling agent content of from 2 parts by mass to 15 parts by mass with respect to 100 parts by mass of the filler, so as to be in contact with the surface of the resin member, to which the surface treatment has been applied; and applying heat, thereby adhering the resin member and the rubber member to each other, is provided.

EXAMPLES

More specific explanation regarding the present disclosure is given below based on Examples. However, the disclosure is by no means limited to these descriptions.

Example 1

<Preparation of Test Piece>

1. Resin Member

As the resin composition, a rectangle shaped plate of a resin, the plate having a thickness of 0.6 mm, is obtained, using HYTREL 4767N (trade name), manufactured by Du Pont-Toray Co., Ltd. as a commercially available thermoplastic polyester elastomer.

2. Rubber Member

The rubber and various compounding agents shown in Table 1 are mixed and stirred at 110° C. for 3 minutes, using a LABO PLASTOMILL (trade name, manufactured by Toyo Seiki Seisaku-sho, Ltd.). Thereafter, a rubber sheet having a thickness of 2.5 mm in a roll is obtained as the rubber member.

3. Surface Treatment

A plasma generator (manufactured by MEISYO KIKO CO., LTD., product name: K2X02L023) is used as the plasma irradiation device that applies surface treatment to the resin member. As the high frequency power source of the plasma generator, a high frequency power source having an applied voltage frequency of 13.56 MHz is used. For the electrode, an electrode having a structure in which a copper tube having an inner diameter of 1.8 mm, an outer diameter of 3 mm and a length of 165 mm is covered with an alumina tube having an outer diameter of 5 mm, a thickness of 1 mm, and a length of 100 mm is used. The resin member is placed on the top face of a sample holder, and the distance between the surface of the resin member and the electrode is set to be 1.0 mm.

The chamber is sealed and decompressed using a rotary pump to attain 10 Pa or less, and then, helium gas is introduced up to atmospheric pressure (that is, 1013 hPa). Thereafter, the high frequency power source is set to attain an output power density (that is, the irradiation density) of 5.7 W/cm$^2$. In addition, the moving velocity of the scanning stage is set to be 2 mm/sec.

Thereafter, while moving the scanning stage, irradiation of plasma is performed under a helium atmosphere with respect to the surface of the resin member (that is, the rectangle shaped plate). The scanning stage is made to move back and forth twice. In this way, surface treatment is performed.

The contact angle for water on the surface to which the surface treatment has been applied, is shown in Table 2 below. However, the contact angle for water shown in Table 2 is an estimation value which has been obtained through the simulation based on the contact angle for water on a resin member obtained by applying surface treatment using a plasma generator whose specifications are different from those of the above plasma generator.

4. Adhesion

The resin member (that is, the rectangle shaped plate), to which plasma treatment has been applied, and the rubber member (that is, the sheet) are stuck together, and are vulcanized for 30 minutes at a vulcanization temperature of 150° C., and a pressure of 2 MPa. In this way, a test piece is obtained.

After the vulcanization, with regard to the test piece, the peeling test being described below is conducted. The results are shown in Table 2.

Examples 2 to 14, and Comparative Examples 1 to 3, and 5

A test piece is prepared in a substantially similar manner to that in Example 1, except that a rubber member (that is, a sheet) is prepared according to the compounding shown in Table 1. Then, the peeling test is conducted.

Comparative Example 4

A test piece is prepared in a substantially similar manner to that in Example 1, except that a rubber member (that is, a sheet) is prepared according to the compounding shown in Table 1. Then, the peeling test is conducted.

Note that, with regard to Comparative Example 4, an estimation value being obtained through the simulation is shown.

<Measurement of Adhesive Strength>

Using the test piece being obtained in each example, a peeling test between the rubber member and the resin member is conducted, using a tensile testing machine (trade name: RTF-1210, manufactured by A&D Company, Limited), under room temperature (that is, at 25° C.), and at a tensile speed of 100 mm/minute. The adhesive strength [N/10 mm] is determined from the maximum intensity.

TABLE 1

| | Example | | | | | | | | | | | | | | Comparative Example | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 | 5 |
| No. | A1 | A2 | A3 | A4 | A5 | A6 | A7 | A8 | A9 | A10 | A11 | A12 | A13 | A14 | B1 | B2 | B3 | B4 | B5 |
| Rubber (SBR) | 100 | 100 | 100 | 100 | 100 | 100 | 100 | 100 | 100 | 100 | 100 | 100 | 100 | 100 | 100 | 100 | 100 | 100 | 100 |
| Carbon black | | | | | | | | | | | | | | 20 | | | | | |
| Silica 1 | | | | 50 | 50 | 50 | 50 | 50 | 50 | | | | | 50 | | 50 | 50 | 20 | 110 |
| Silica 2 | 50 | | | | | | | | | | | | | | | | | | |
| Silica 3 | | 40 | 50 | | | | | | | 70 | 90 | | | | | | | | |
| Silica 4 | | | | | | | | | | | | 50 | 70 | | | | | | |
| Silane coupling agent | 5.0 | 5.0 | 5.0 | 1.0 | 2.0 | 3.0 | 4.0 | 5.0 | 7.0 | 7.0 | 9.0 | 5.0 | 7.0 | 5.0 | 0 | 0 | 9.0 | 1.0 | 11.0 |
| Stearic acid | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Sulfur | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 |
| Accelerator (DPG) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Accelerator (CZ) | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 |
| Accelerator (DM) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

(unit: parts by mass)

TABLE 2

| | Example | | | | | | | | | | | | | | Comparative Example | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 | 5 |
| No. | A1 | A2 | A3 | A4 | A5 | A6 | A7 | A8 | A9 | A10 | A11 | A12 | A13 | A14 | B1 | B2 | B3 | B4 | B5 |
| Amount of Silica [phr] | 50 | 40 | 50 | 50 | 50 | 50 | 50 | 50 | 50 | 70 | 90 | 50 | 70 | 50 | 0 | 50 | 50 | 20 | 110 |
| Amount of Silane coupling agent (*1) | 10 | 12.5 | 10 | 2 | 4 | 60 | 8 | 10 | 14 | 10 | 10 | 10 | 10 | 10 | — | 0 | 18 | 5 | 10 |
| Contact angle for water [°] | 61.0 | 61.0 | 61.0 | 61.0 | 61.0 | 61.0 | 61.0 | 61.0 | 61.0 | 61.0 | 61.0 | 61.0 | 61.0 | 61.0 | 61.0 | 61.0 | 61.0 | 61.0 | 61.0 |
| Adhesive strength [N/10 mm] | 37.2 | 90.4 | 113.9 | 51.2 | 36.0 | 60.5 | 60.3 | 85.1 | 34.4 | 67.3 | 59.3 | 81.8 | 61.4 | 41.0 | 0.8 | 29.9 | 18.6 | 20.2 | *2 |

(*1): Amount of silane coupling agent with respect to 100 parts of silica [parts]
*2: Not producible of a rubber sheet Details of the components shown in Table 1 are as follows.
- Rubber (SBR)/styrene butadiene rubber, JSR Corporation, JSR1502
- Carbon black/ASAHI CARBON CO., LTD., Asahi #51
- Silica 1/manufactured by TOSOH SILICA CORPORATION, product name: Nipsil AQ, BET specific surface area: 210 $m^2/g$
- Silica 2/manufactured by TOSOH SILICA CORPORATION, product name: Nipsil HQ-N, BET specific surface area: 260 $m^2/g$
- Silica 3/manufactured by Nippon Aerosil Co., Ltd., product name: AEROSIL 50130, BET specific surface area: 200 $m^2/g$
- Silica 4/manufactured by Nippon Aerosil Co., Ltd., product name: AEROSIL 200, BET specific surface area: 300 $m^2/g$
- Silane coupling agent/manufactured by Shin-Etsu Chemical Co., Ltd., product name: Bis-(triethoxysilylpropyl)-polysulfide
- Accelerator (DPG)/diphenylguanidine, manufactured by OUCHI SHINKO CHEMICAL INDUSTRIAL CO., LTD., NOCCELER D
- Accelerator (CZ)/N-cyclohexylbenzothiazylsulfenamide, manufactured by OUCHI SHINKO CHEMICAL INDUSTRIAL CO., LTD., NOCCELER CZ
- Accelerator (DM)/di-2-benzothiazolyl disulfide, manufactured by OUCHI SHINKO CHEMICAL INDUSTRIAL CO., LTD., NOCCELER DM

EXPLANATION OF SYMBOLS

1 Bead wire
2 Rubber sheet
3 Wire coating layer
12 Bead portion
16 Crown portion
17 Tire casing (an example of a tire frame)
18 Bead core
26 Belt layer
26A Belt cord
26B Coating resin
28 Cushion rubber
30 Tread layer
110 Tire
112 Bead portion
114 Tire side portion
116 Tread portion
118 Bead core
122 Protective layer
124A Belt layer
124B Cushion rubber
130 Tread layer
140 Tire casing (an example of a tire frame)
200 Tire
CL Tire equatorial plane

The invention claimed is:

1. A tire, comprising a resin-rubber composite comprising:
a resin member that has a treated surface, to which a surface treatment comprising a plasma treatment has been applied, the resin member comprising at least one resin selected from the group consisting of a thermoplastic polyester elastomer and a thermoplastic polyester resin; and
a rubber member that is disposed in contact with the treated surface of the resin member and that comprises a rubber, silica as a filler having a silanol group, and a silane coupling agent, with a silica content of from 30 phr to 100 phr with respect to 100 phr of the rubber, and a silane coupling agent content of from 2 parts by mass to 14 parts by mass with respect to 100 parts by mass of the filler, the silica having a BET specific surface area of 150 $m^2/g$ to 400 $m^2/g$, and the silane coupling agent being a polysulfide-based silane coupling agent having two or more sulfurs,
wherein the silane coupling agent comprises at least one selected from the group consisting of bis-(3-triethoxysilyl) propyl)-disulfide, bis-(3-triethoxysilyl) propyl)-tetrasulfide, and bis-(triethoxysilylpropyl)-polysulfide.

2. The tire according to claim 1, comprising a belt layer as the resin member, and at least one member selected from a tread, a tire frame, or a rubber sheet adhered to a surface of the belt layer, as the rubber member.

3. The tire according to claim 1, wherein at least one selected from the group consisting of a peroxy radical (—O—O—), a hydroperoxide group (—O—OH), a carbonyl group (—C(=O)—), an aldehyde group (—C(=O)—H), a carboxyl group (—C(=O)—OH), and a hydroxyl group (—OH) is introduced to the treated surface of the resin member by the surface treatment.

4. The tire according to claim 1, wherein a contact angle of water on the treated surface of the resin member is from 20° to 98°.

5. The tire according to claim 1, wherein the silica comprises a hydrophilic silica.

6. The tire according to claim 1, further comprising a second rubber member that is disposed in contact with the rubber member.

* * * * *